US009682644B2

(12) United States Patent
Fujita et al.

(10) Patent No.: US 9,682,644 B2
(45) Date of Patent: Jun. 20, 2017

(54) SEAT

(71) Applicant: Delta Kogyo Co., Ltd., Aki-gun (JP)

(72) Inventors: Etsunori Fujita, Higashihiroshima (JP);
Yumi Ogura, Higashihiroshima (JP);
Seiji Kawasaki, Higashihiroshima (JP);
Yuji Hattori, Hiroshima (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 275 days.

(21) Appl. No.: 14/505,679

(22) Filed: Oct. 3, 2014

(65) Prior Publication Data
US 2015/0108820 A1 Apr. 23, 2015

(30) Foreign Application Priority Data
Oct. 19, 2013 (JP) ................. 2013-217933

(51) Int. Cl.
A47C 7/40 (2006.01)
B60N 2/70 (2006.01)
(Continued)

(52) U.S. Cl.
CPC .............. *B60N 2/7011* (2013.01); *B60N 2/64* (2013.01); *B60N 2/68* (2013.01); *B60N 2/70* (2013.01);
(Continued)

(58) Field of Classification Search
CPC ............ A47C 7/282; A47C 31/02; A47C 7/40
(Continued)

(56) References Cited

U.S. PATENT DOCUMENTS 2,952,302 A * 9/1960 Mittlieder .............. A47C 1/027
297/327
3,117,327 A * 1/1964 Mathew ............... A47C 15/006
297/188.14
(Continued)

FOREIGN PATENT DOCUMENTS

JP 2004-147772 5/2004
WO WO 02/091881 A1 11/2002

*Primary Examiner* — Syed A Islam
(74) *Attorney, Agent, or Firm* — Oblon, McClelland, Maier & Neustadt, L.L.P.

(57) ABSTRACT

To provide a seat having a high cushioning property, excellent in a drainage property, and suitable for outdoor use.
A belt-shaped support member 30 for seat back is supported on an upper portion of a seat back frame 10, a belt-shaped support member 40 for seat cushion having end portions 42, 43 connected to a front portion of a seat cushion frame 20 is connected to a lower portion of the belt-shaped support member 30 for seat back, and a base support member 50 is disposed on a seat cushion. A surface cushion layer 60 with which a cushioning part for seat back and a cushioning part for seat cushion are integrally formed is disposed by being supported on the upper portion of the seat back frame 10 and the front portion of the seat cushion frame 20. The end portions 42, 43 of the belt-shaped support member 40 for seat cushion connected to the front portion of the seat cushion frame 20 work as a fulcrum for supporting a portion from the waist to the vicinity of the pelvis of a seated person, and an upper portion of the surface cushion layer 60 supported on the upper portion of the seat back frame 10 works as a fulcrum for supporting a portion from the femoral region to the vicinity of the hip of the seated person.

9 Claims, 22 Drawing Sheets

(51) Int. Cl.
*B60N 2/64* (2006.01)
*B60N 2/68* (2006.01)
*A47C 31/02* (2006.01)
*A47C 7/28* (2006.01)

(52) U.S. Cl.
CPC ............... *A47C 7/282* (2013.01); *A47C 7/40* (2013.01); *A47C 31/02* (2013.01)

(58) Field of Classification Search
USPC ............ 297/452.48, 452.63, 452.64, 452.11, 297/452.56, 452.55
See application file for complete search history.

(56) References Cited

U.S. PATENT DOCUMENTS

| | | | | |
|---|---|---|---|---|
| 4,828,320 | A * | 5/1989 | Saiger | A47C 7/24 297/229 |
| 5,403,220 | A * | 4/1995 | Goad, Sr. | A47C 15/006 440/38 |
| 6,435,618 | B1 * | 8/2002 | Kawasaki | A47C 7/28 297/452.56 |
| 6,676,218 | B2 * | 1/2004 | Fujita | B60N 2/5891 297/452.49 |
| 2004/0145230 | A1 | 7/2004 | Fujita et al. | |
| 2004/0232743 | A1 * | 11/2004 | Fujita | B61D 33/0014 297/216.1 |
| 2008/0290715 | A1 * | 11/2008 | Fullerton | B60N 2/7011 297/452.18 |

* cited by examiner

SEAT

BACKGROUND OF THE INVENTION

Field of the Invention

Embodiment of the present invention relates to a seat, and more particularly to a seat which realizes the simplification and weight reduction of structures of members supporting a cushioning part for seat back and a cushioning part for seat cushion, is suitable as chairs or the like for spectators' seats used outdoors such as stands of a stadium, and is also suitable for vehicles such as automobiles.

Description of the Related Art

The present inventor has proposed various vehicle seats using a three-dimensional knitted fabric. The three-dimensional knitted fabric exhibits high stiffness when pressed with a certain area or larger, while exhibiting a soft spring property when partially pressed, and can securely support a human body even if it is a thin type, and does not press a partial region with a strong reactive force, and thus is suitable for long-time seating. However, since the three-dimensional knitted fabric having a thickness of about several mm to about several ten mm is used, a feeling of stroke at the time of seating is sometimes insufficient, and as a measure for this, there has been proposed, as a base support member, a mechanism or the like which supports a flat spring member by a coil spring as described in, for example, Patent Document 1.

Since many seats are used in stands and the like of a stadium, they are often molded at low cost by using rigid plastic, but a seat more excellent in sitting comfort is expected as a demand from a management side of the stadium or from a spectator side. Further, for outdoor use, a measure has to be taken against rain, and many of the seats have a drain hole formed in a seat cushion (refer to Patent Document 2).

[Patent Document 1] WO 2002/091881
[Patent Document 2] Japanese Patent Application Laid-open No. 2004-147772

In recent years, in accordance with improvement of fuel efficiency of automobiles, the popularization of electric vehicles, hybrid cars, and the like, and so on, there has occurred a demand for further reduction of thickness and weight of seats mounted on automobiles. This is also the case with seats used in stands, and even as seats more excellent in sitting comfort, since they are used in large number in stands, those that are thin and light-weighted are expected for convenience of transportation and installation, and further those that cost as low as possible are preferable. In addition, when they are used outdoors, it is also necessary to solve a problem occurring in terms of a drainage property (water discharge) in order to prevent water from staying on a seat cushion.

The present invention was made in consideration of the aforesaid problems, and has an object to provide a seat which realizes reduction of thickness and weight and can be manufactured at low cost, and further, is excellent in a drainage property, is suitable for use outdoors such as stands, and is also applicable as a vehicle seat of an automobile and the like.

SUMMARY OF THE INVENTION

In order to solve the aforesaid problems, a seat of the present invention includes: a belt-shaped support member for seat back supported on an upper portion of a seat back frame and extending up to a lower portion of the seat back frame; a belt-shaped support member for seat cushion extending from a lower portion of the belt-shaped support member for seat back in a direction toward a front portion of a seat cushion frame and having end portions connected to the front portion of the seat cushion frame; a cushioning part for seat back supported by the seat back frame; and a cushioning part for seat cushion supported by the seat cushion frame, wherein the belt-shaped support member for seat cushion shares and supports a load given from a seated person to the belt-shaped support member for seat back, with the end portions which are connected to the front portion of the seat cushion frame working as fulcrums.

Preferably, the belt-shaped support member for seat back has a plurality of longitudinal belt parts for seat back extending from the upper portion up to the lower portion of the seat back frame to form a substantially V-shape, and a middle part of the belt-shaped support member for seat cushion is connected to lower portions of the longitudinal belt parts for seat back and is provided in a substantially U-shape in a plane view.

Preferably, a pair of side frame parts forming the seat cushion frame are each made of a pipe member formed in a substantially L-shape, shorter side portions of the side frame parts are located at the front portion, and the end portions of the belt-shaped support member for seat cushion are connected to the shorter side parts of the side frame parts.

Preferably, the seat further includes a base support member supported by the seat cushion frame, the seat cushion frame has a rearward extending part extending more rearward than a connection portion between the lower portion of the belt-shaped support member for seat back and the belt-shaped support member for seat cushion, and the base support member is supported between the front portion of the seat cushion frame and the rearward extending part.

Preferably, the base support member has: a two-dimensional net or a belt-shaped support member for base; and an intermediate cushion layer which is provided in a range from a front frame part of the seat cushion frame up to the connection portion between the lower portion of the belt-shaped support member for seat back and the belt-shaped support member for seat cushion so as to be stacked on the two-dimensional net or the belt-shaped support member for base.

Preferably, the base support member has: a two-dimensional net or a belt-shaped support member for base; and an intermediate cushion layer which is provided in a range from a front frame part of the seat cushion frame up to a center position of a seat cushion in terms of a front and rear direction so as to be stacked on the two-dimensional net or the belt-shaped support member for base.

Preferably, the intermediate cushion layer is a three-dimensional knitted fabric.

Preferably, the belt-shaped support member for seat back has a plurality of longitudinal belt parts for seat back extending from the upper portion to the lower portion of the seat back frame to form a substantially V-shape, and the belt-shaped support member for seat cushion has longitudinal belt parts for seat cushion which extend from lower portions of the longitudinal belt parts for seat back of the belt-shaped support member for seat back, pass on a lower surface side of the cushioning part for seat cushion supported by the seat cushion frame, and at end portions thereof, are connected to the front portion of the seat cushion frame.

Preferably, the longitudinal belt parts for seat back of the belt-shaped support member for seat back and the longitudinal belt parts for seat cushion of the belt-shaped support member for seat cushion are integrated, and when the seat back frame is reclined by a predetermined angle relatively to the seat cushion frame, a rear portion of the cushioning part for seat cushion lifts up more than before the seat back frame is reclined by the predetermined angle, due to the longitudinal belt parts for seat cushion.

Preferably, the seat further includes a surface cushion layer whose upper portion is supported on the upper portion of the seat back frame and whose front portion is supported on the front portion of the seat cushion frame, and with which the cushioning part for seat back and the cushioning part for seat cushion are integrally formed, and the upper portion of the surface cushion layer works as a fulcrum for supporting the vicinity of a hip of the seated person.

Preferably, the surface cushion layer at least partly has a three-dimensional knitted fabric.

EFFECT OF THE INVENTION

In the seat of the present invention, the belt-shaped support member for seat back is supported on the upper portion of the seat back frame, and on the lower portion of the belt-shaped support member for seat back, the belt-shaped support member for seat cushion which extends from this lower portion in the direction toward the front portion of the seat cushion frame and whose end portions are connected to the front portion of the seat cushion frame is provided. Consequently, a load given from the seated person to the cushioning part for seat back, especially a support load of a portion from the waist to the vicinity of the pelvis not only is supported by the belt-shaped support member for seat back but also is shared and supported by the belt-shaped support member for seat cushion, with the end portions thereof which are connected to the front portion of the seat cushion frame working as the fulcrum.

That is, since the cushioning part for seat back and the cushioning part for seat cushion are supported by using the belt-shaped members, namely, the belt-shaped support member for seat back and the belt-shaped support member for seat cushion, a support structure of the cushioning part for seat back and the cushioning part for seat cushion is simple, which enables reduction of thickness and weight and makes it possible to reduce manufacturing cost.

Further, in the seat of the present invention, the cushioning part for seat back and the cushioning part for seat cushion are suspended on and supported by the seat back frame and the seat cushion frame respectively, and thus are structured like a hammock. When the cushioning part for seat back and the cushioning part for seat cushion are thus disposed like a hammock, a seated person feels as if his/her body is hung due to contact portions (hammock feeling). This feeling is stronger as a distance from the contact portion up to a fulcrum for hanging the contact portion is shorter. However, according to the present invention, a portion from the waist to the vicinity of the pelvis of the seated person is supported in a sharing manner by the belt-shaped support member for seat cushion, with the end portions thereof connected to the front portion of the seat cushion frame whose distance from the waist and the vicinity of the pelvis is long, working as the fulcrum, and accordingly, it is possible to support the back of the seated person in a stable posture while reducing the hammock feeling felt by the portion from the waist to the vicinity of the pelvis. Further, since the surface cushion layer with which the cushioning part for seat back and the cushioning part for seat cushion are integrated is provided, a portion from the femoral region to the vicinity of the hip of the seated person is supported by the surface cushion layer, with the upper portion thereof which is apart from the femoral region and the vicinity of the hip and is supported on the upper portion of the seat back frame, working as the fulcrum, so that the hammock feeling felt by the portion from the femoral region to the vicinity of the hip is reduced.

Further, in the present invention, it is preferable to use the three-dimensional knitted fabric as the surface cushion layer. Consequently, even when it rains, rainwater does not stay on the seat cushion but is quickly discharged through gaps in the net, a gap between the belt-shaped support members, and so on. Therefore, the present invention is suitable as a seat used outdoors such as stands. Of course, it can be used indoors, and in any case, even though it has a simple structure, owing to the belt-shaped support members and the surface cushion layer, the hammock feeling when the person is seated is reduced and at the same time, a certain degree of feeling of stroke is obtained, and as compared with a conventional seat, a feeling of seating is improved and a feeling of fatigue due to the long-time seating is reduced. Further, having such a property of capable of reducing the feeling of fatigue and enabling a weight reduction by using the belt-shaped support members, the present invention is suitable as a vehicle seat of an automobile and the like.

DETAILED DESCRIPTION OF THE PREFERRED EMBODIMENTS

Figure 1:
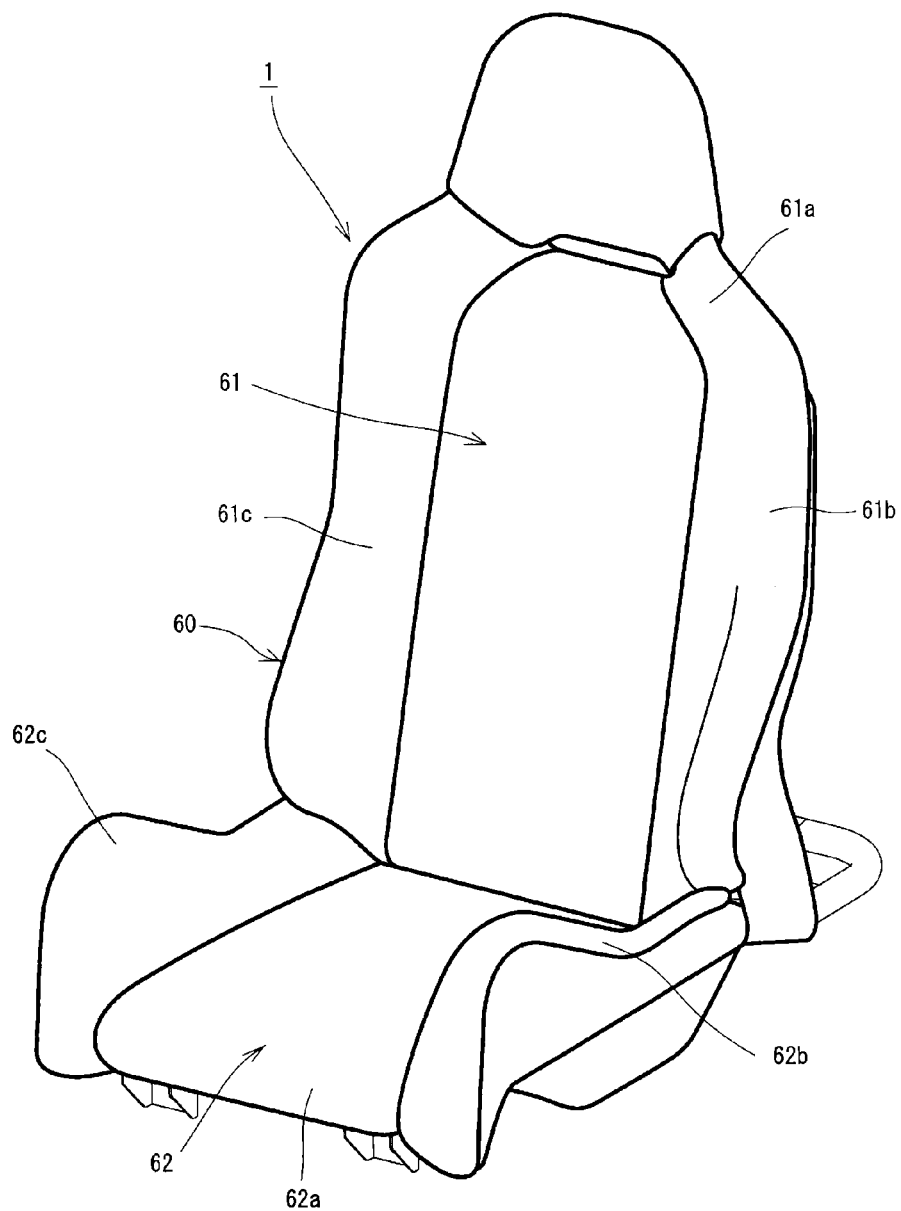
FIG. 1 is a perspective view illustrating an outer appearance of a seat according to one embodiment of the present invention.
Figure 2:
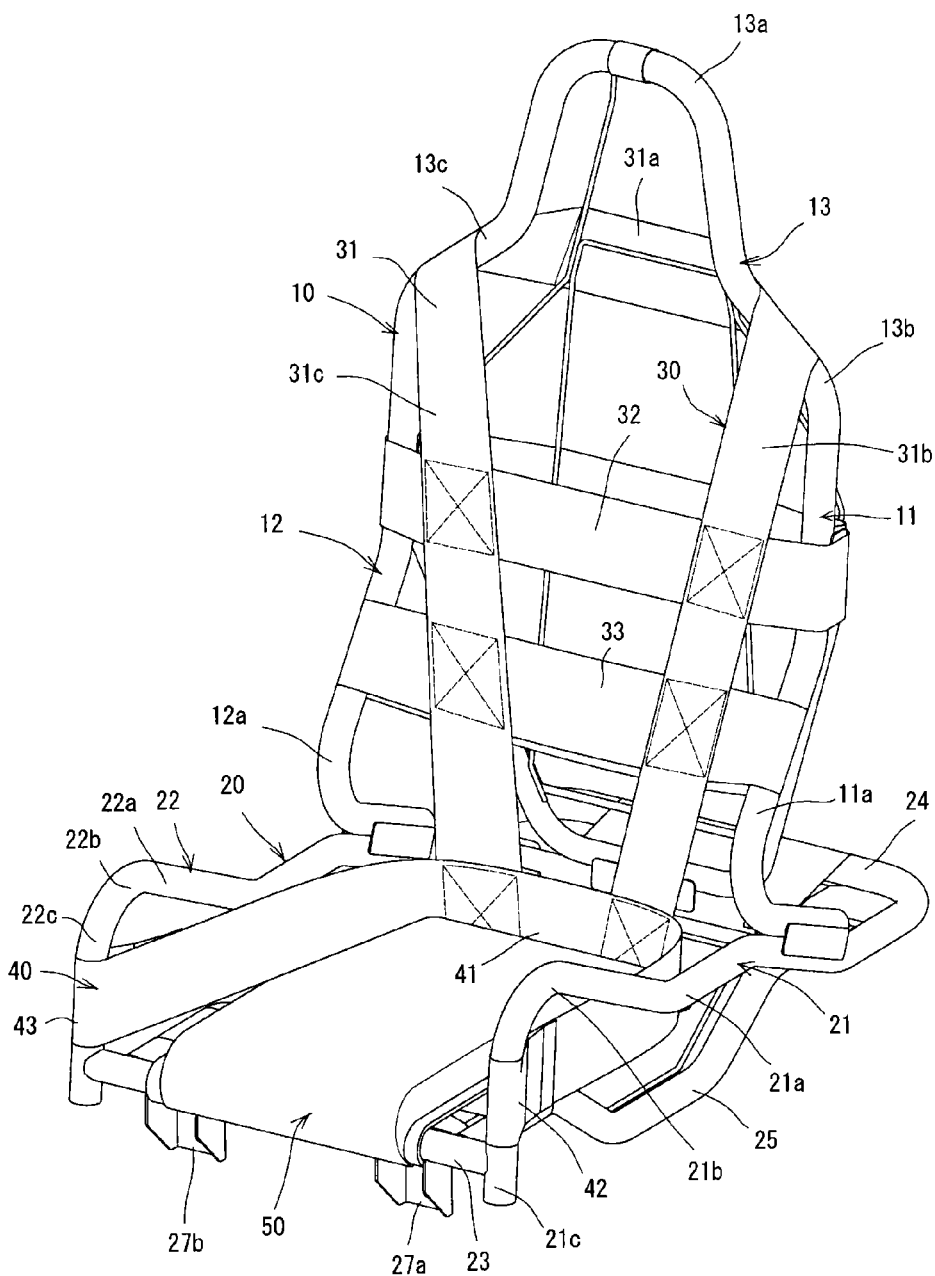
FIG. 2 is a perspective view of the seat in FIG. 1 seen from a front side, with a surface cushion layer being removed and belt-shaped support members and a base support member being disposed on frames.
Figure 3:
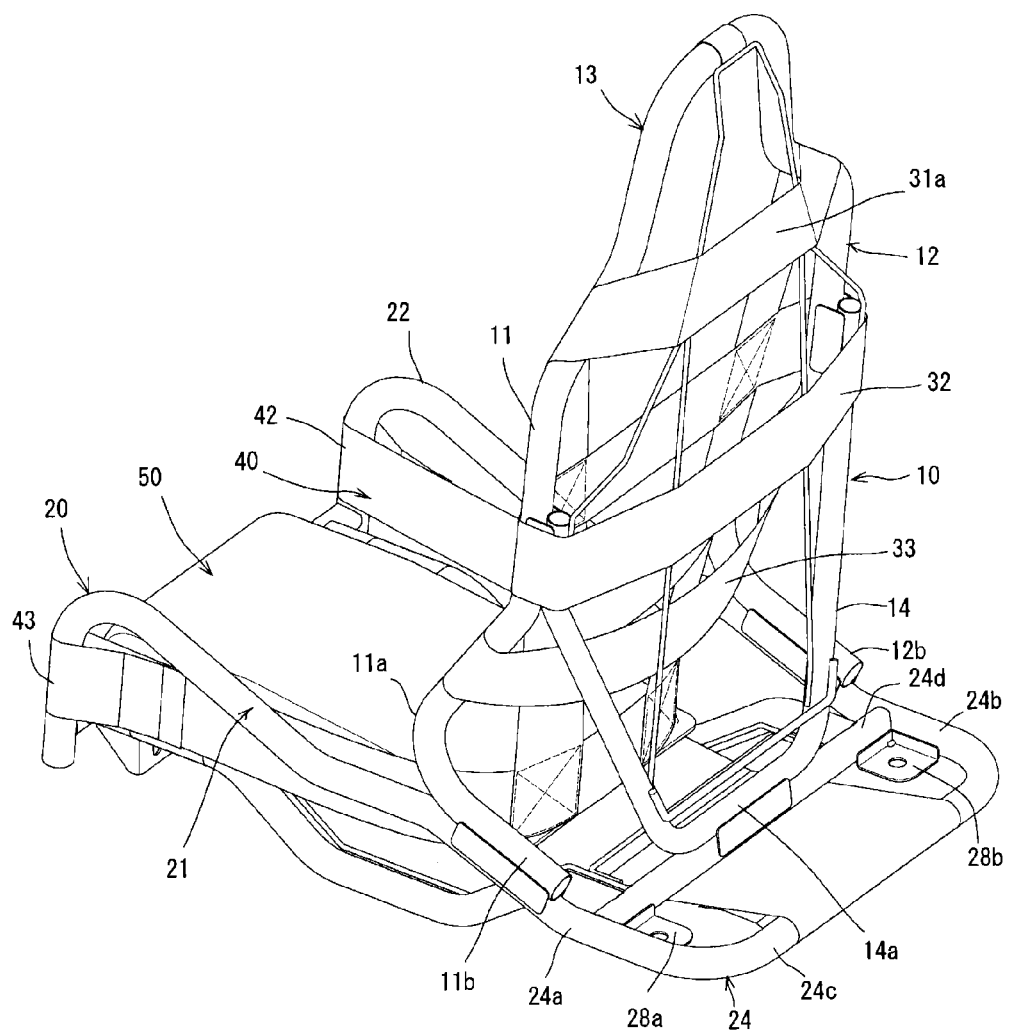
FIG. 3 is a perspective view of the seat in FIG. 1 seen from a rear side, with the surface cushion layer being removed and the belt-shaped support members and the base support member being disposed on the frames.
Figure 4:
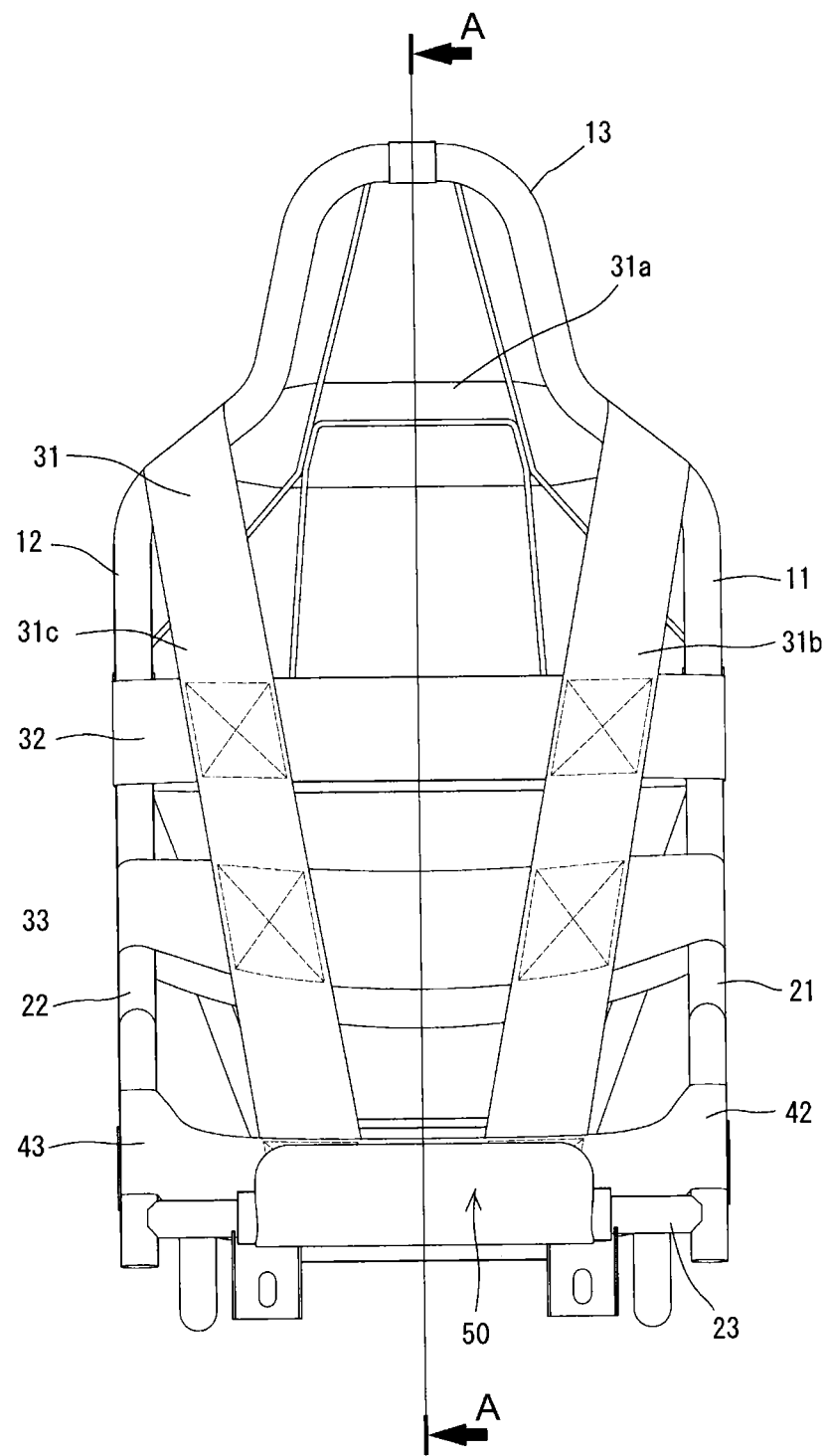
FIG. 4 is a front view of the seat in FIG. 1, with the surface cushion layer being removed and the belt-shaped support members and the base support member being disposed on the frames.
Figure 5:
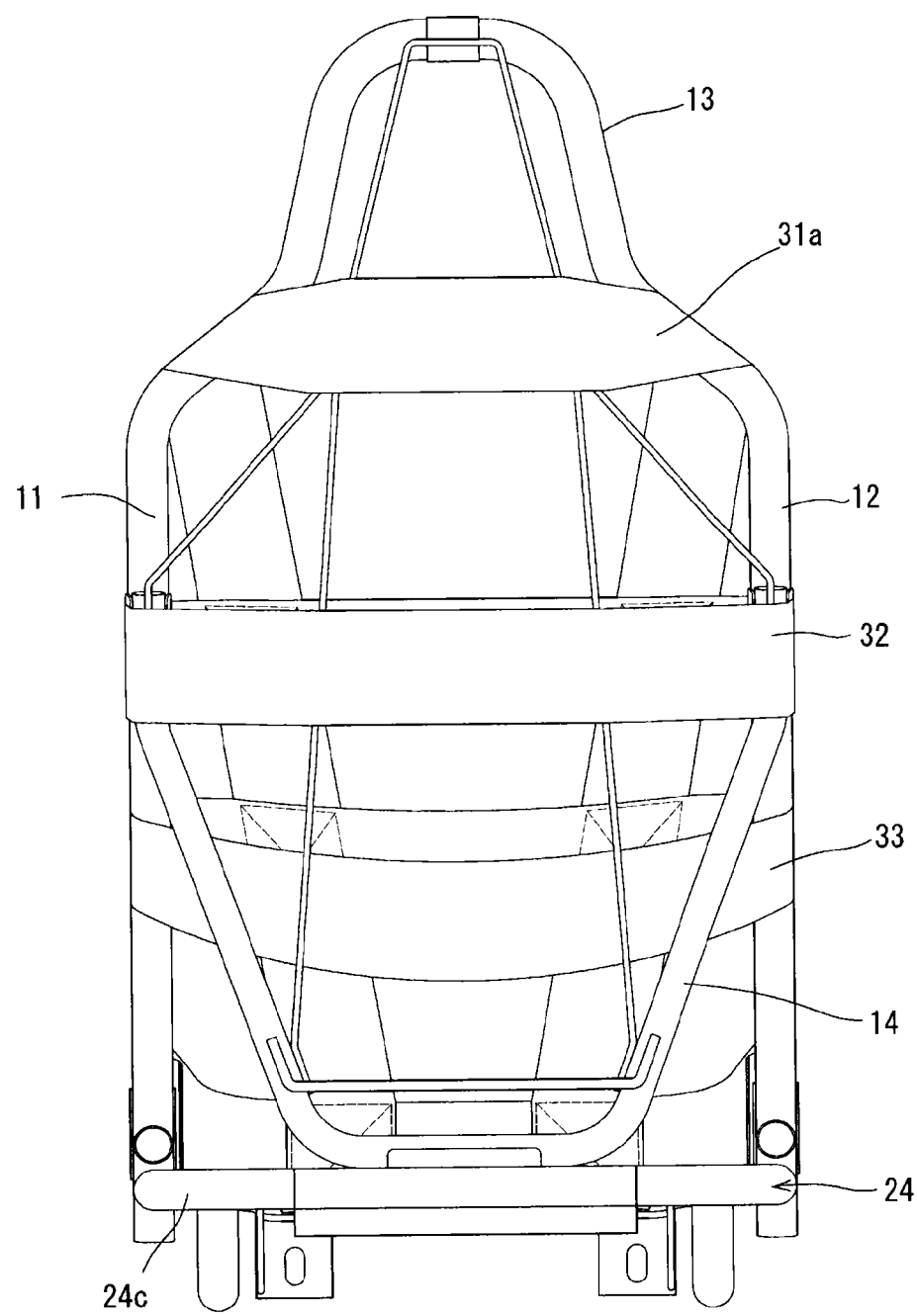
FIG. 5 is a rear view of the seat in FIG. 1, with the surface cushion layer being removed and the belt-shaped support members and the base support member being disposed on the frames.
Figure 6:
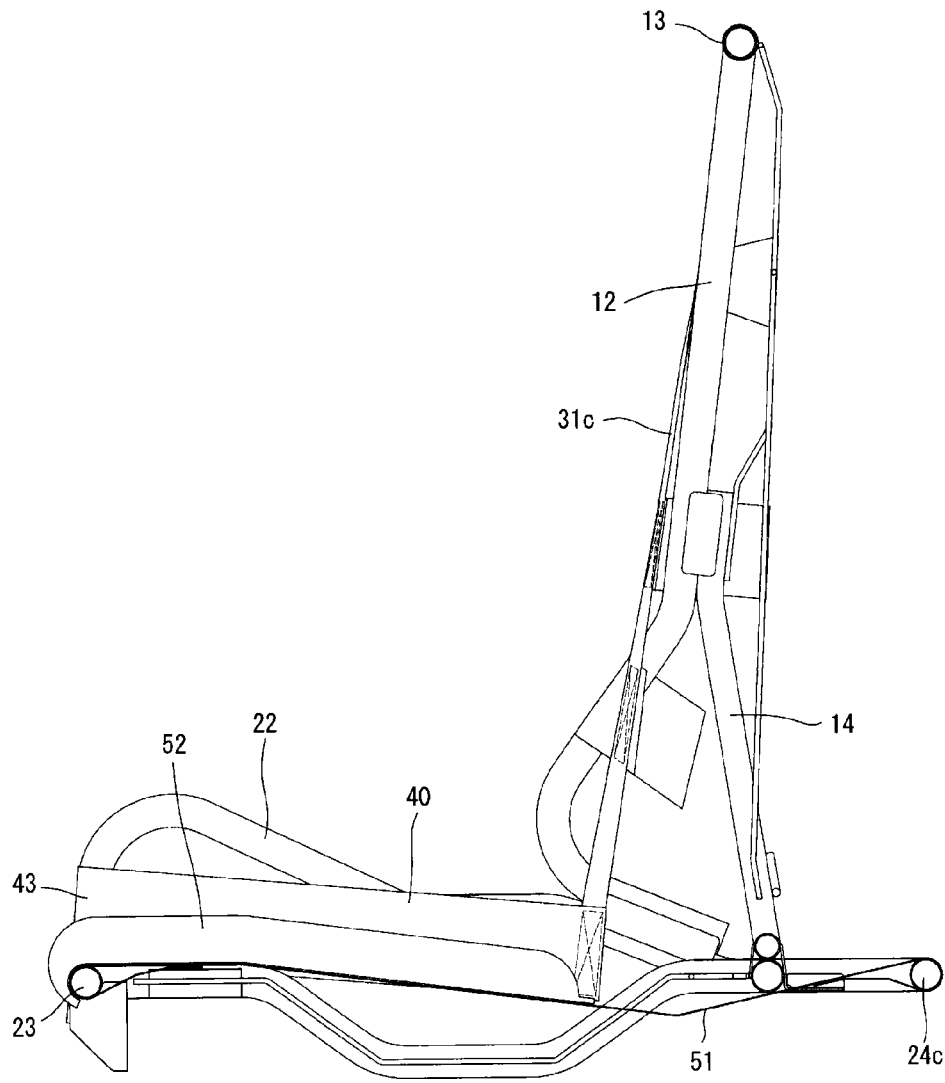
FIG. 6 is a cross-sectional view taken along A-A line in FIG. 4.
Figure 7:
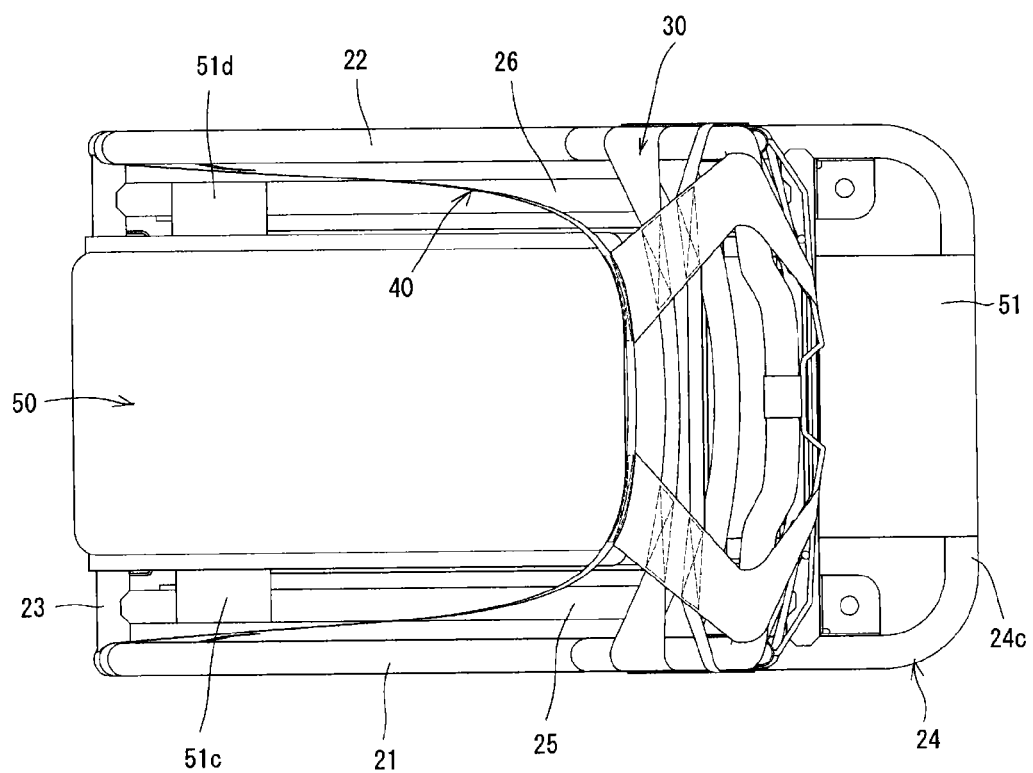
FIG. 7 is a plane view of the seat in FIG. 1, with the surface cushion layer being removed and the belt-shaped support members and the base support member being disposed on the frames.

Hereinafter, the present invention will be described in more detail based on embodiments illustrated in the drawings. A seat 1 of this embodiment includes a seat back frame 10, a seat cushion frame 20, a belt-shaped support member 30 for seat back, a belt-shaped support member 40 for seat cushion, a base support member 50, and a surface cushion layer 60.

The seat back frame 10 is made of a pipe member formed in a substantially inverted U-shape, and has a pair of left and right side frame parts 11, 12 disposed at a predetermined interval and an upper frame part 13 connecting the side frame parts 11, 12. The upper frame part 13 has, at its center, a headrest part 13a formed in a substantially inverted U-shape, and portions between both side portions of the headrest part 13a and the side frame parts 11, 12 are upper connecting frame parts 13b, 13c of the seat back frame 10.

The side frame parts 11, 12 of the seat back frame 10 have, in their lower portions, bulging parts 11a, 12a bulging forward, which support side portions of a seated person. Further, a U-shaped reinforcing frame part 14 in a substantially U-shape is provided to extend rear obliquely downward from substantially center portions of the side frames 11, 12, in order to increase strength of the seat back frame 10.

The seat cushion frame 20 includes a pair of left and right side frame parts 21, 22 and a front frame part 23 suspended between front end portions of the side frame parts 21, 22. The side frame parts 21, 22 are formed in a substantially L-shape in a side view and their shorter side parts 21c, 22c are disposed so that a positional relation becomes such that their longer side parts 21a, 22a extend in a front and rear direction and their bent parts 21b, 22b hang downward. The front frame part 23 is suspended between end portions of the shorter side parts 21c, 22c.

The seat cushion frame 20 has a rearward extending part 24 extending rearward from the pair of left and right side frame parts 21, 22. The rearward extending part 24 has: rear side frame parts 24a, 24b extending rearward directly from the side frame parts 21, 22; and a rear lateral frame part 24c suspended between the rear side frame parts 24a, 24b, and has a substantially C-shape in a plane view. A reinforcing lateral frame part 24d is suspended between the rear side frame parts 24a, 24b at a position more forward than the rear lateral frame part 24c, and a bottom part 14a of the aforesaid U-shaped reinforcing frame part 14 of the seat back frame 10 is fixed to and supported by the reinforcing lateral frame part 24d. Further, lower parts 11b, 12b under the bulging parts 11a, 12a formed in the side frame parts 11, 12 of the seat back frame 10 extend rearward, and these lower parts 11b, 12b are fixed to rear portions of the longer side parts 21a, 22a of the side frame parts 21, 22 of the seat cushion frame 20. Thus, the seat back frame 10 and the seat cushion frame 20 are integrated.

Incidentally, in the vicinities of areas under the side frames 21, 22 of the seat cushion frame 20, reinforcing longitudinal frame parts 25, 26 suspended between the front frame part 23 and the reinforcing lateral frame part 24d are provided.

As the belt-shaped support member 30 for seat back, a belt whose width is about several cm is used. Its material is not limited, but since it supports a load of the seated person, one with high strength such as a belt woven with polyester fibers or the like, used as a seatbelt of an automobile is preferable.

Figure 8:
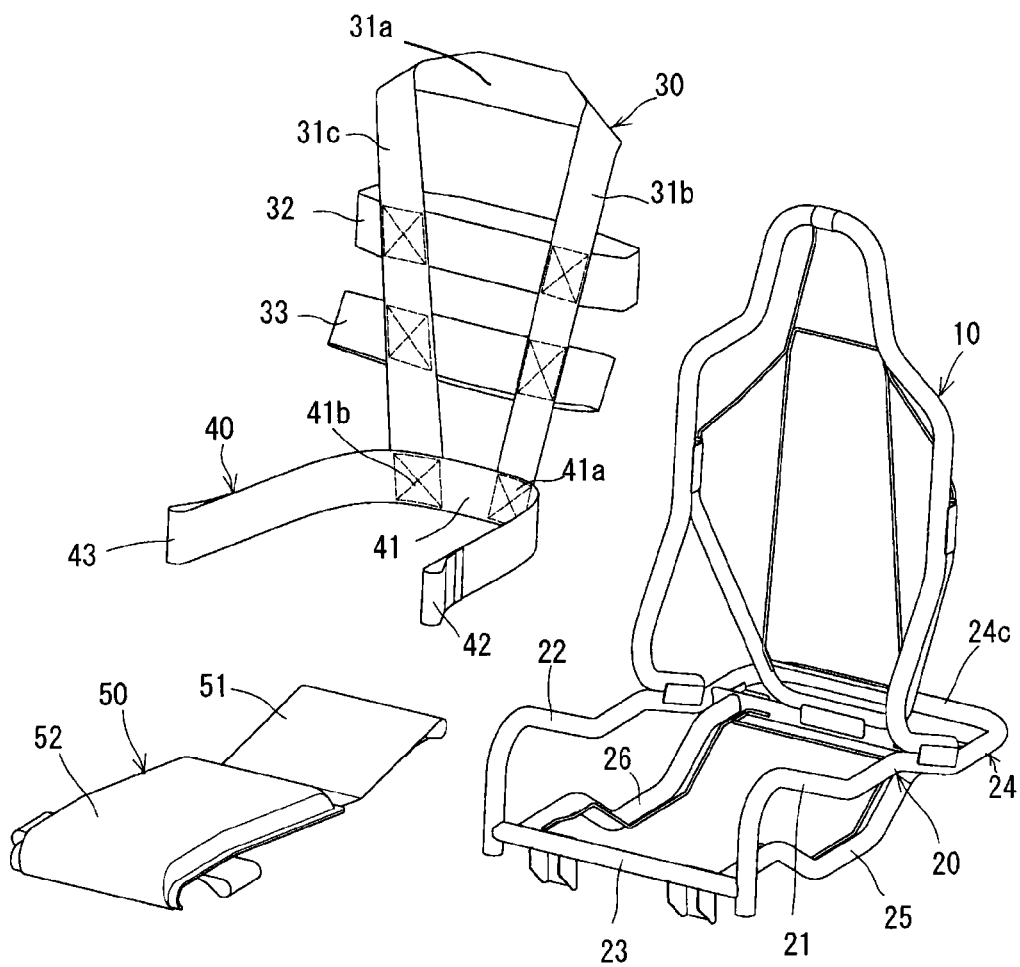
FIG. 8 is an exploded perspective view of FIG. 2.
Figure 9:
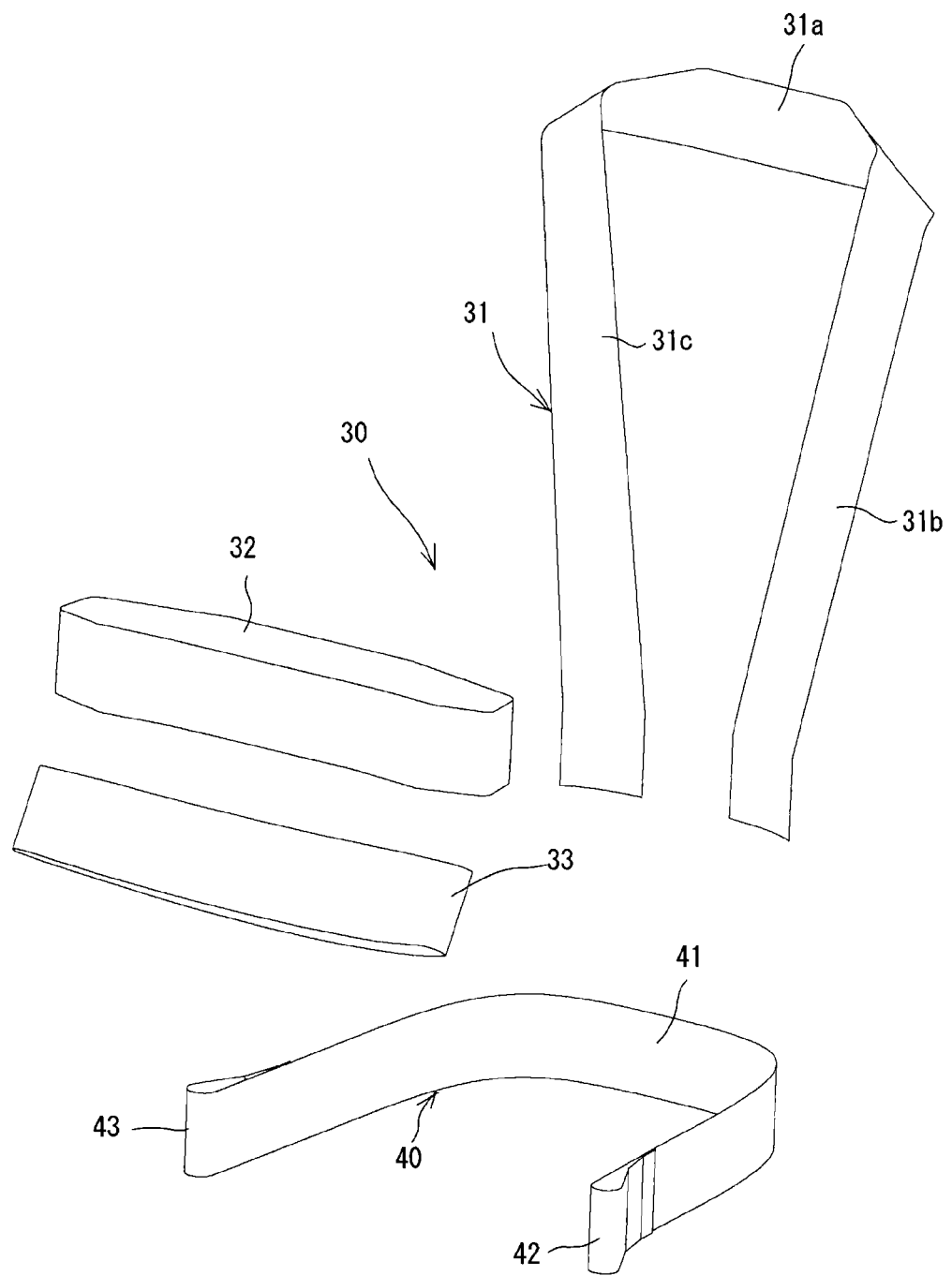
FIG. 9 is an exploded perspective view illustrating a belt-shaped support member for seat back and a belt-shaped support member for seat cushion.

The belt-shaped support member 30 for seat back is formed to have a first belt member 31, a second belt member 32, and a third belt member 33, as illustrated in FIG. 8 and FIG. 9. The first belt member 31 has a lateral belt part 31a for seat back with a predetermined width located at a substantially center portion and two longitudinal belt parts 31b, 31c for seat back folded downward from the vicinities of both ends of the lateral belt part 31a for seat back. The lateral belt part 31a for seat back is disposed so as to pass on a rear side of the headrest part 13a of the seat back frame 10, and the two longitudinal belt parts 31b, 31c for seat back are provided so as to cross over the upper connecting frame parts 13b, 13c to hang down at front-side positions, as illustrated in FIG. 2 to FIG. 5. Incidentally, since the longitudinal belt parts 31b, 31c for seat back are folded from the lateral belt part 31a for seat back along the upper connecting frame parts 13b, 13c which are obliquely inclined, the longitudinal belt parts 31b, 31c for seat back are provided so as to gradually approach each other from an upper portion toward a lower portion according to an inclination angle of the upper connecting frame parts 13b, 13c to form a substantially V-shape. Consequently, it is possible to stably support the back of the seated person.

The second belt member 32 and the third belt member 33 are both formed in a loop shape. The second belt member 32 and the third belt member 33 are disposed on the longitudinal belt parts 31b, 31c for seat back of the first belt member 31 by sewing so as to extend in a substantially horizontal direction, the former being disposed near a position corresponding to the breast of the seated person and the latter being disposed near a position corresponding to the waist of the seated person. That is, the second belt member 32 is attached at such positions as to surround the vicinities of fixing portions between the side frame parts 11, 12 of the seat back frame 10 and the U-shaped reinforcing frame part 14, as illustrated in FIG. 2 to FIG. 6. The third belt member 33 is attached under the second belt member 32 at such positions as to surround regions closer to upper portions of the bulging parts 11a, 12a.

The belt-shaped support member 40 for seat cushion is made of the same material as that of the belt-shaped support member 30 for seat back, and its middle part 41 is connected to lower portions of the longitudinal belt parts 31b, 31c for seat back of the first belt member 31 by sewing. The longitudinal belt parts 31b, 31c for seat back are provided so as to form the substantially V-shape as described above, but their lower portions do not overlap with each other and are apart from each other, and therefore, connection portions 41a, 41b at which the longitudinal belt parts 31b, 31c for seat back are connected with the middle part 41 of the belt-shaped support member 40 for seat cushion exist at two places.

The belt-shaped support member 40 for seat cushion is connected at the middle part 41 as described above, and its end portions 42, 43 are connected to the shorter side parts 21c, 22c located in the front portions of the pair of left and right side frame parts 21, 22 of the seat cushion frame 20 so that the belt-shaped support member 40 for seat cushion has a substantially U-shape in a plane view.

Figure 10:
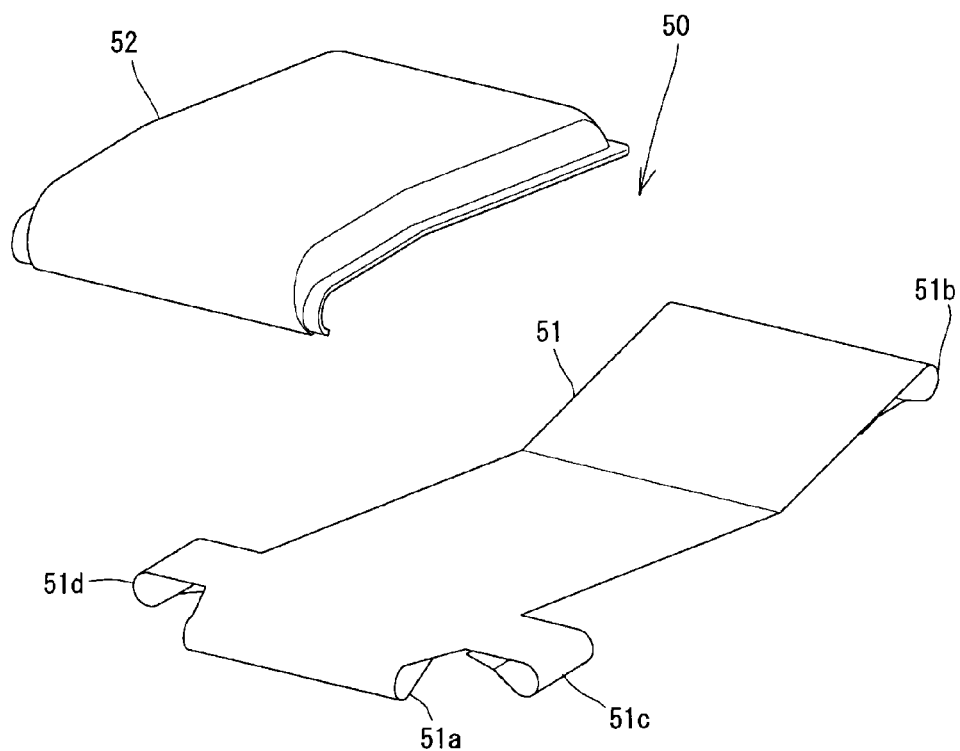
FIG. 10 is an exploded perspective view of the base support member.

In this embodiment, the base support member 50 is formed of a stacked structure of a two-dimensional net 51 and a three-dimensional knitted fabric 52 as an intermediate cushion layer as illustrated in FIG. 10. As the two-dimensional net 51, usable is, for example, highly stretchy one in which at least one of a warp yarn and a weft yarn is made of an elastic yarn such as a polyester-based elastomer fiber or a polyurethane fiber. This two-dimensional net 51 is stretched on the seat cushion frame 20, and preferably, it has a length from the front frame part 23 up to the rear lateral frame part 24c, and has a front end part 51a engaged with the front frame part 23 and a rear end part 51b engaged with the rear lateral frame part 24c. Further, near the front end part 51a, side attachment parts 51c, 51d projecting sideways are provided, and the side attachment parts 51c, 51d are engaged with the reinforcing longitudinal frame parts 25, 26 disposed under the side frame parts 21, 22 respectively.

The two-dimensional net 51 has the length up to the rear lateral frame part 24c of the rearward extending part 24, but a portion from the waist to the pelvis of the seated person is supported by the vicinities of the lower portions of the longitudinal belt parts 31b, 31c for seat back of the first belt member 31 in the belt-shaped support member 30 for seat back and by the vicinity of the middle part 41 of the belt-shaped support member 40 for seat cushion, and thus in a range more forward than the connection portions 41a, 41b of the both, the portion from the waist to the pelvis of the seated person is in contact with a seat surface. Therefore, in order to produce a feeling of stroke in this range, that is, in order to produce a feeling of stroke at a position corresponding to the portion from the vicinity of the back of the knees to the vicinity of the hip of the seated person, the three-dimensional knitted fabric 52 is provided to cover the front frame part 23 and extend up to the vicinities of the connection portions 41a, 41b between the belt-shaped support member 30 for seat back and the belt-shaped support member 40 for seat cushion. Incidentally, the three-dimensional knitted fabric 52 is formed by connecting a pair of ground knitted fabrics disposed apart from each other by connecting yarns, and it exhibits high stiffness when pressed with a certain area or larger, while exhibiting a soft spring property when pressed in part, and has a high cushioning property even if it is thin. A material, a knitting way, and so on of the used three-dimensional knitted fabric 52 are not limited, and those conforming to necessary properties can be selected. As the intermediate cushion layer, the three-dimensional knitted fabric 52 is preferable, but a cushion material such as a urethane material is also usable. However, when the seat 1 of this embodiment is used as spectators' seats of outdoor stands, and the like, the use of the three-dimensional knitted fabric 52 is preferable in consideration of a rainwater drainage property.

In this embodiment, the surface cushion layer 60 is integrally formed with the cushioning part 61 for seat back and the cushioning part 62 for seat cushion, and is supported, with an upper part 61a being engaged with the upper frame part 13 of the seat back frame 10 and with a front part 62a being engaged with the front frame part 23 of the seat cushion frame 20. Incidentally, side parts 61b, 61c of the cushioning part 61 for seat back and side parts 62b, 62c of the cushioning part 62 for seat cushion are disposed to cover the side frame parts 11, 12 of the seat back frame 10 and the side frame parts 21, 22 of the seat cushion frame 20 respectively. Therefore, the cushioning part 61 for seat back is disposed to cover the belt-shaped support member 30 for seat back and the cushioning part 62 for seat cushion is disposed to cover the belt-shaped support member 40 for seat cushion and the base support member 50. The surface cushion layer 60 is preferably one from which water is discharged through its stitches when the seat 1 of this embodiment is used for spectators' seats of the outdoor stands or the like, and a three-dimensional knitted fabric which has a high cushioning property even if it is thin as described above is preferably used. A material, a knitting way, and so on of the used three-dimensional knitted fabric can be appropriately selected so as to conform to necessary properties as described above.

Figure 11:
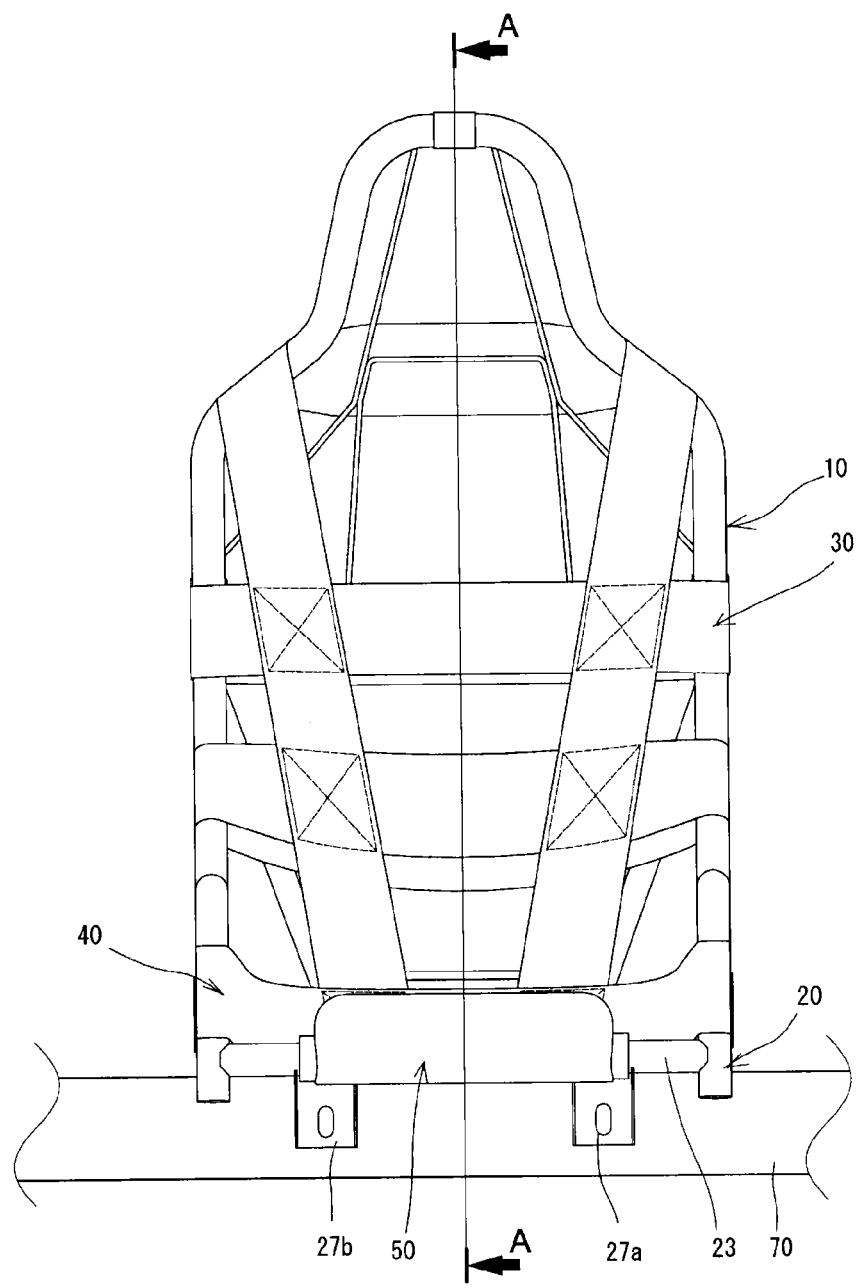
FIG. 11 is a front view of the seat in FIG. 1, with the surface cushion layer being removed and the belt-shaped support members and the base support member being disposed on the frames, in a state where it is attached to bases disposed in an installation place.
Figure 12:
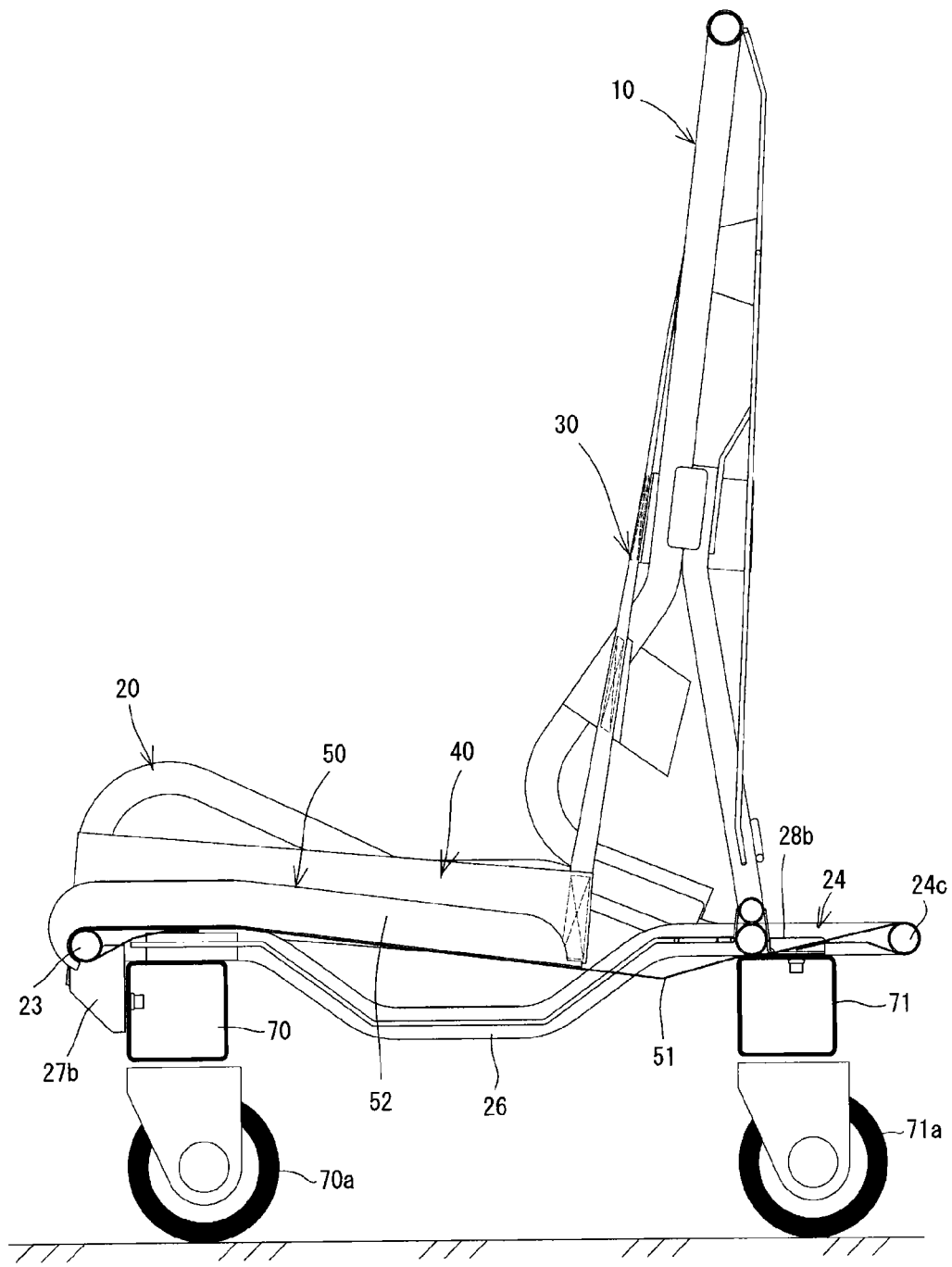
FIG. 12 is a cross-sectional view taken along A-A line in FIG. 11.

As illustrated in FIG. 11 and FIG. 12, when the seat 1 of this embodiment is used, attachment brackets 27a, 27b attached to the front frame part 23 of the seat cushion frame 20 and attachment brackets 28a, 28b provided on inner sides of the rear side frame parts 24a, 24b of the rearward extending part 24 are fixed to bases 70, 71 provided in an installation place such as a stand of a stadium. The bases 70, 71 may be fixed to the stand, or may have casters 70a, 71a for movement as illustrated in FIG. 12.

When a person is seated on the seat 1 of this embodiment, a load of the portion from the waist to the vicinity of the pelvis of the seated person is supported by the belt-shaped support member 30 for seat back via the cushioning part 61 for seat back, and in particular, is supported by the vicinities of the lower portions of the longitudinal belt parts 31b, 31c for seat back of the first belt member 31 in the belt-shaped support member 30 for seat back and the vicinity of the middle part 41 of the belt-shaped support member 40 for seat cushion. However, in this embodiment, the belt-shaped support member 40 for seat cushion has the end portions 42, 43 connected to the shorter side parts 21c, 22c located in the front portions of the pair of left and right side frame parts 21, 22 of the seat cushion frame 20, and therefore, according to the movement of the seated person in a rotation direction and a left and right direction, the belt-shaped support member 40 for seat cushion displaces, with the end portions 42, 43 working as operation fulcrums. That is, according to the seat 1 of this embodiment, the load given to the cushioning part 61 for seat back is shared and supported by the belt-shaped support member 40 for seat cushion, with the end portions 42, 43 working as the fulcrums. Since the waist and the vicinity of the pelvis are distant from the end portions 42, 43 being the support fulcrums, it is possible to support the back of the seated person in a stable posture while reducing a hammock feeling felt by the portion from the waist to the vicinity of the pelvis.

Further, in supporting the portion from the femoral region to the vicinity of the hip of the seated person, the upper portion 61a of the cushioning part 61 for seat back of the surface cushion layer 60, which upper portion is supported by the upper frame part 13 of the seat back frame 10 and is distant from the femoral region and the vicinity of the hip, serves as the fulcrum. Therefore, the hammock feeling felt by the portion from the femoral region to the vicinity of the hip is also reduced.

Further, since the two-dimensional net 51 of the base support member 50 is engaged with the rear lateral frame part 24c of the rearward extending part 24, the length of the two-dimensional net 51 is longer than a sitting range of the seated person, and therefore, a sufficient feeling of stroke can be obtained even though it is a thin type.

The seat 1 of this embodiment is composed of the belts whose width is about several cm, namely, the belt-shaped support member 30 for seat back and the belt-shaped support member 40 for seat cushion, the base support member 50 having many meshes (stitches), and the surface cushion layer 60. Therefore, rainwater does not stay on the seat surface but is discharged through the meshes (stitches), and is further discharged through gaps between the belts, which eliminates a need to provide a special water drain hole, enables the simple and low-cost manufacture, and thus is suitable for outdoor use. In addition, being made of members such as the belts and the net, the seat 1 is light-weighted and its installation work and transportation work are easy.

Here, in the above-described embodiment, as illustrated in FIG. 10, the base support member 50 is formed of the stacked structure of the two-dimensional net 51 and the three-dimensional knitted fabric 52, and out of these, the three-dimensional knitted fabric 52 covers the front frame part 23 and is provided up to the vicinities of the connection portions 41a, 41b between the belt-shaped support member 30 for seat back and the belt-shaped support member 40 for seat cushion, so that a sufficient feeling of stroke occurs in the portion from the vicinity of the back of the knees to the vicinity of the hip of the seated person when he/she is seated deep in the seat cushion. Of course, in the use for spectators' seats of the stadium and the like, a user is often seated shallow on a front portion of the seat cushion because he/she concentrates on a game, but according to the above-described embodiment, a feeling of stroke can be exhibited even in such a case because the top of the front frame part 23 is covered by the three-dimensional knitted fabric 52.

Figure 13:
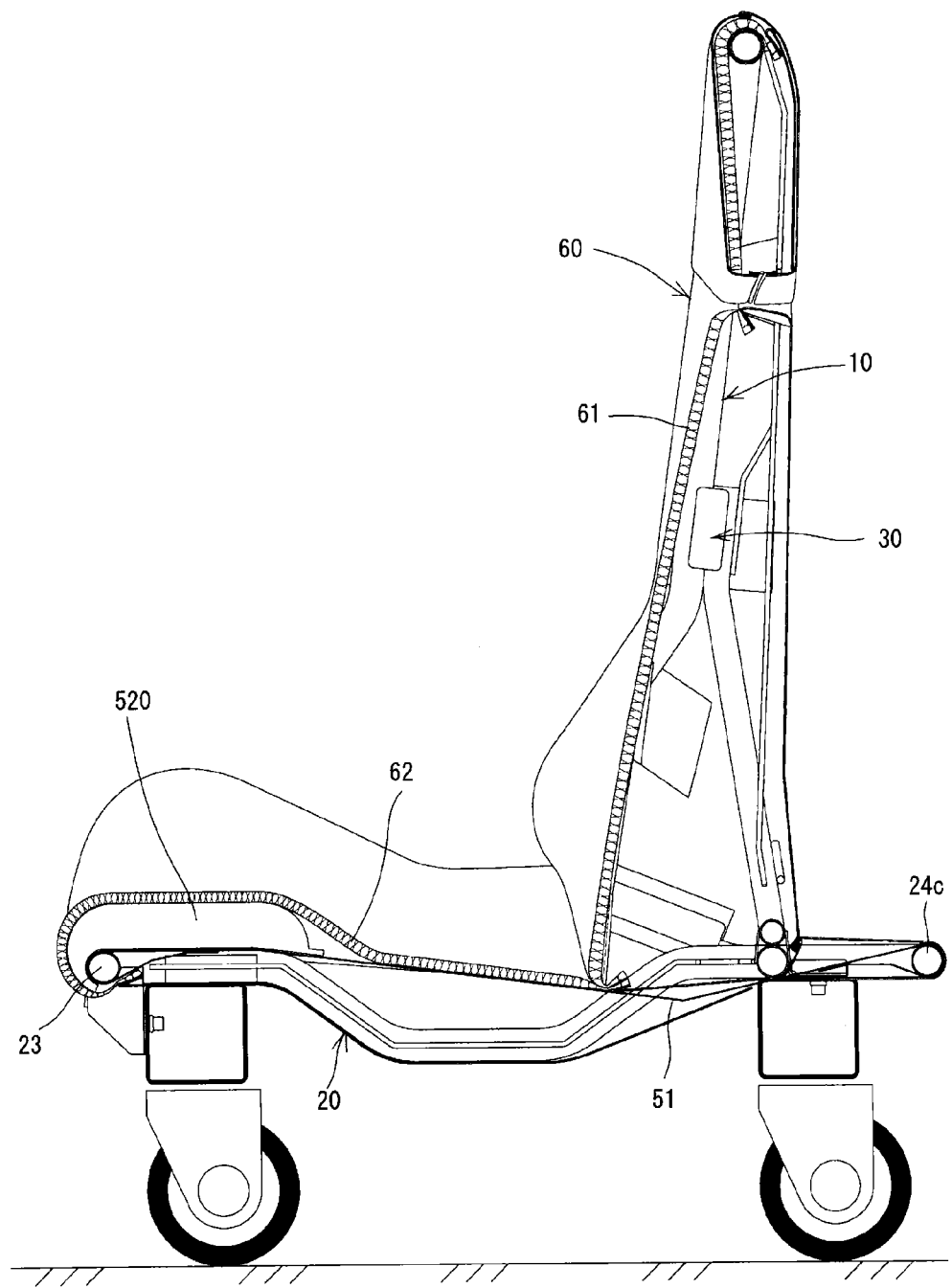
FIG. 13 is a cross-sectional view illustrating a seat of an example where a three-dimensional knitted fabric of a type having a short front-rear length is disposed on a front frame part
Figure 14:
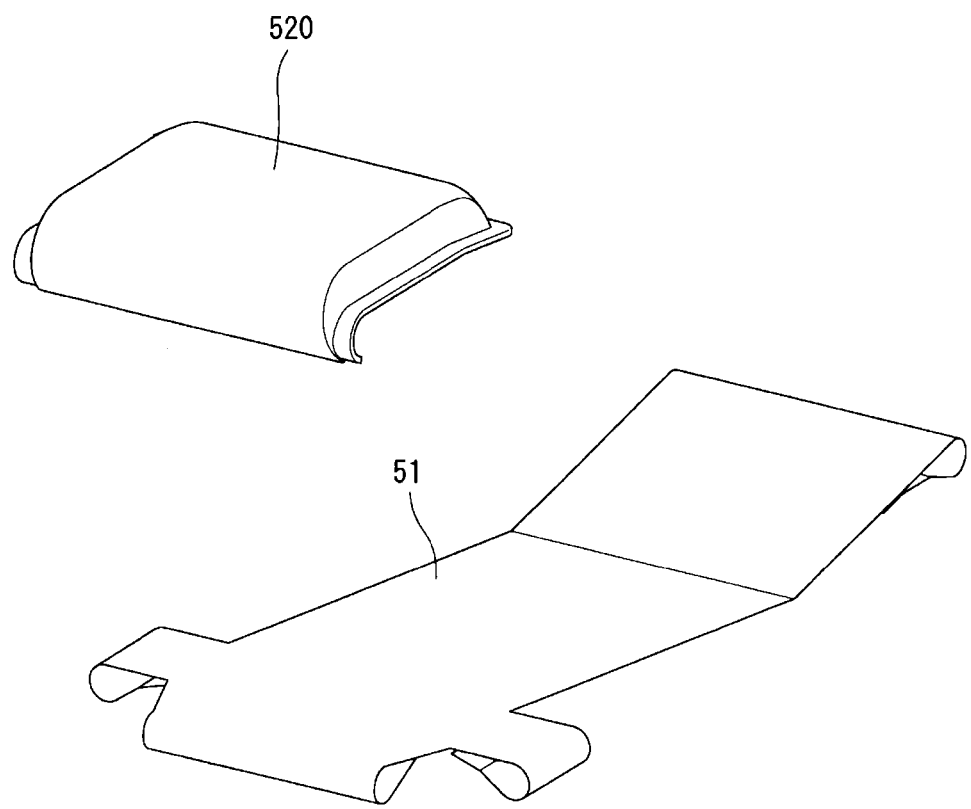
FIG. 14 is an exploded perspective view illustrating a base support member composed of the three-dimensional knitted fabric illustrated in FIG. 13 and a two-dimensional net.

In the structure of the present invention, the feeling of stroke in the seat cushion felt by the seated person is ensured to a certain degree by the two-dimensional net 51 stretched on the seat cushion frame 20 and the cushioning part 62 for seat cushion of the surface cushion layer 60 covering a surface of the two-dimensional net 51. Further, the seat 1 is temporarily used and installed in large number in stands and the like. Therefore, in order to reduce manufacturing cost, the base support member 50 can have a structure not using the three-dimensional knitted fabric 52. However, a seated person is often seated shallow on the front portion, and when no three-dimensional knitted fabric 52 is provided, the front frame part 23 of the seat cushion frame 20 presses the portion from the back of the knees to the femoral region. Therefore, in order to alleviate a pressed feeling, a three-dimensional knitted fabric 520 with a short front-rear length disposed only in a range from the front frame part 23 to a position more forward than a center position of the seat cushion front-rear length is preferably disposed as illustrated in FIG. 13 and FIG. 14. Consequently, a certain feeling of stroke is obtained in the portion from the vicinity of the back of the knees to the femoral region when the person is seated, the pressed feeling due to the front frame part 23 can be alleviated, and the manufacturing cost can be lower than that in the case where the three-dimensional knitted fabric 52 with the long front-rear length described in the above embodiment is used.

Figure 15:
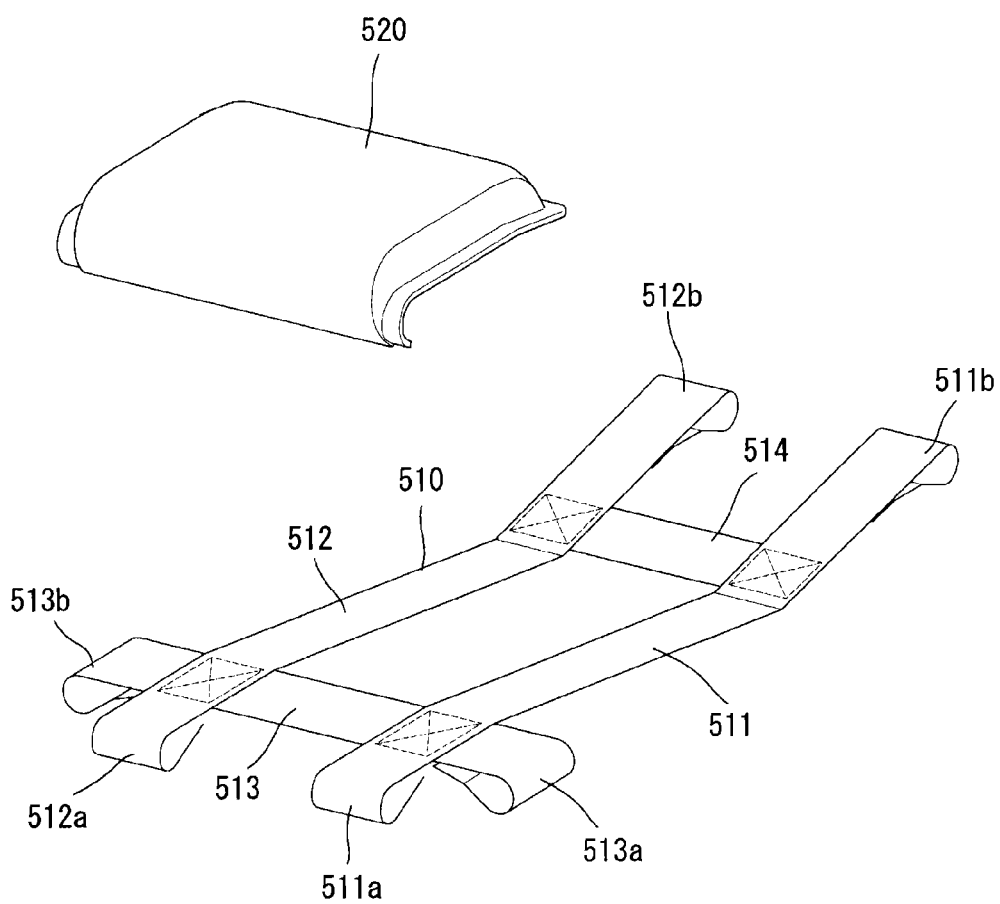
FIG. 15 is an exploded perspective view illustrating a base support member using a belt-shaped support member for base, instead of the two-dimensional net in FIG. 14.
Figure 16:
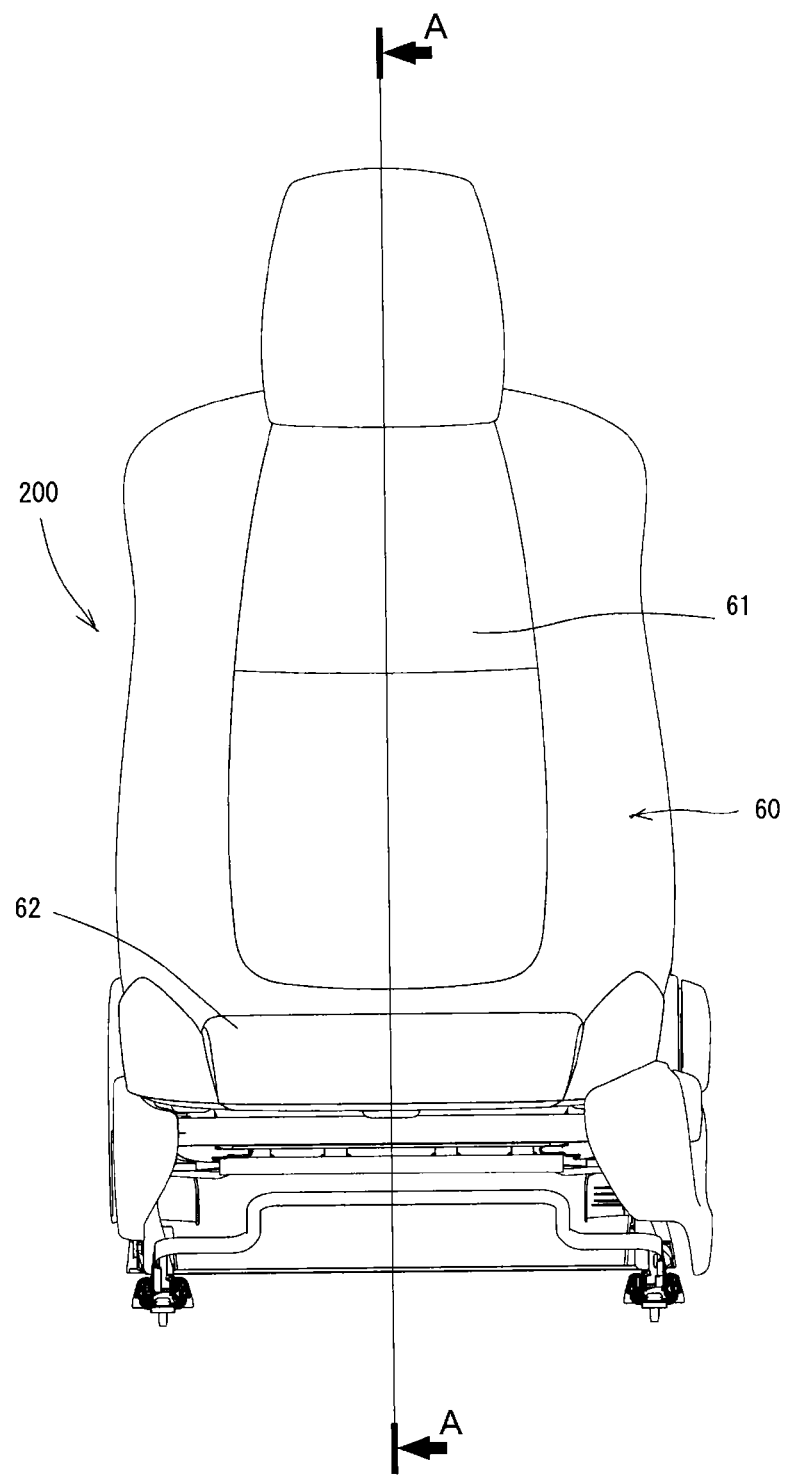
FIG. 16 is a front view illustrating an application example to an automobile seat.
Figure 17:
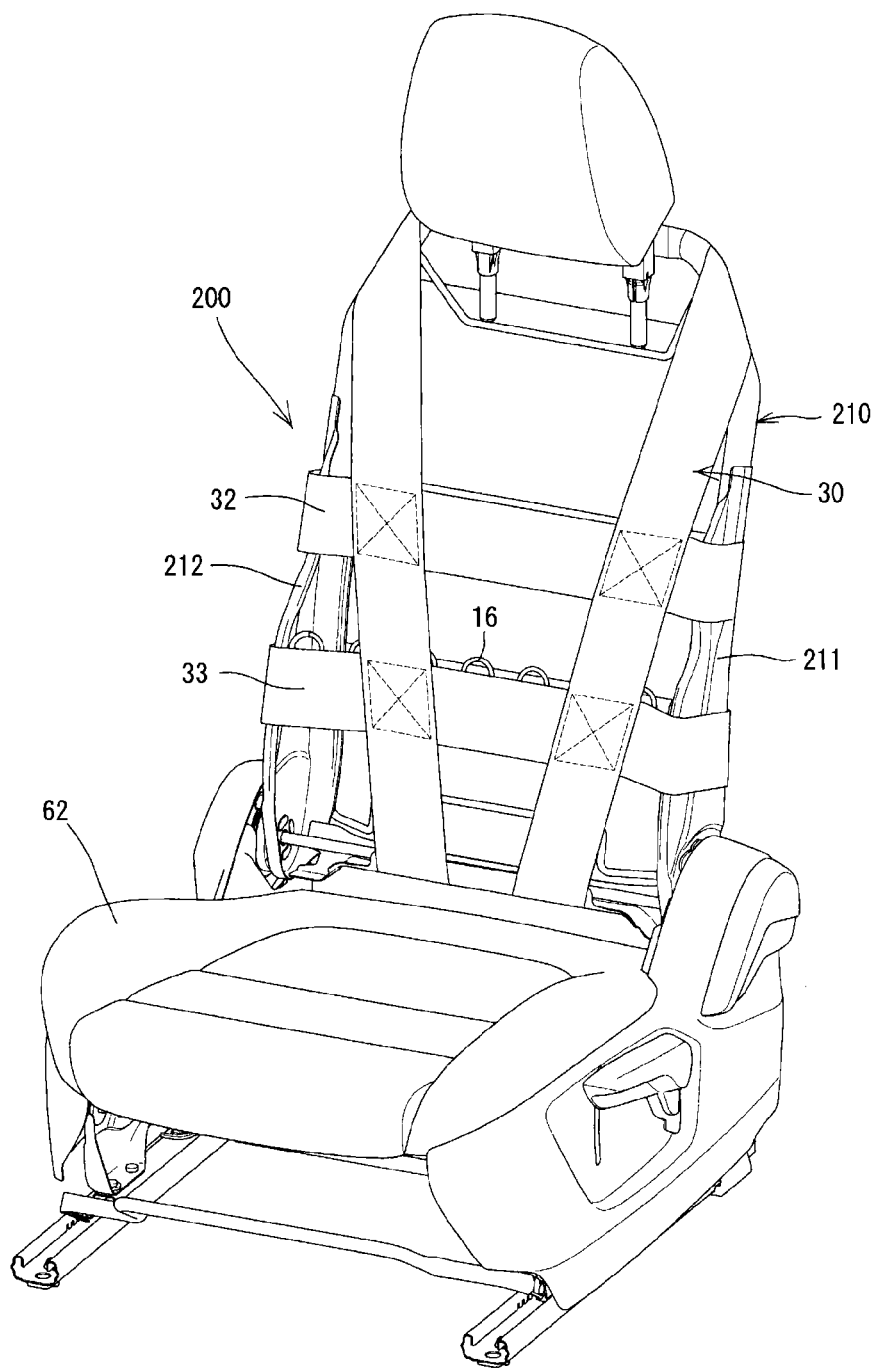
FIG. 17 is a perspective view illustrating the application example to the automobile seat seen from a front side, with a cushioning part for seat back of a surface cushion layer being removed.
Figure 18:
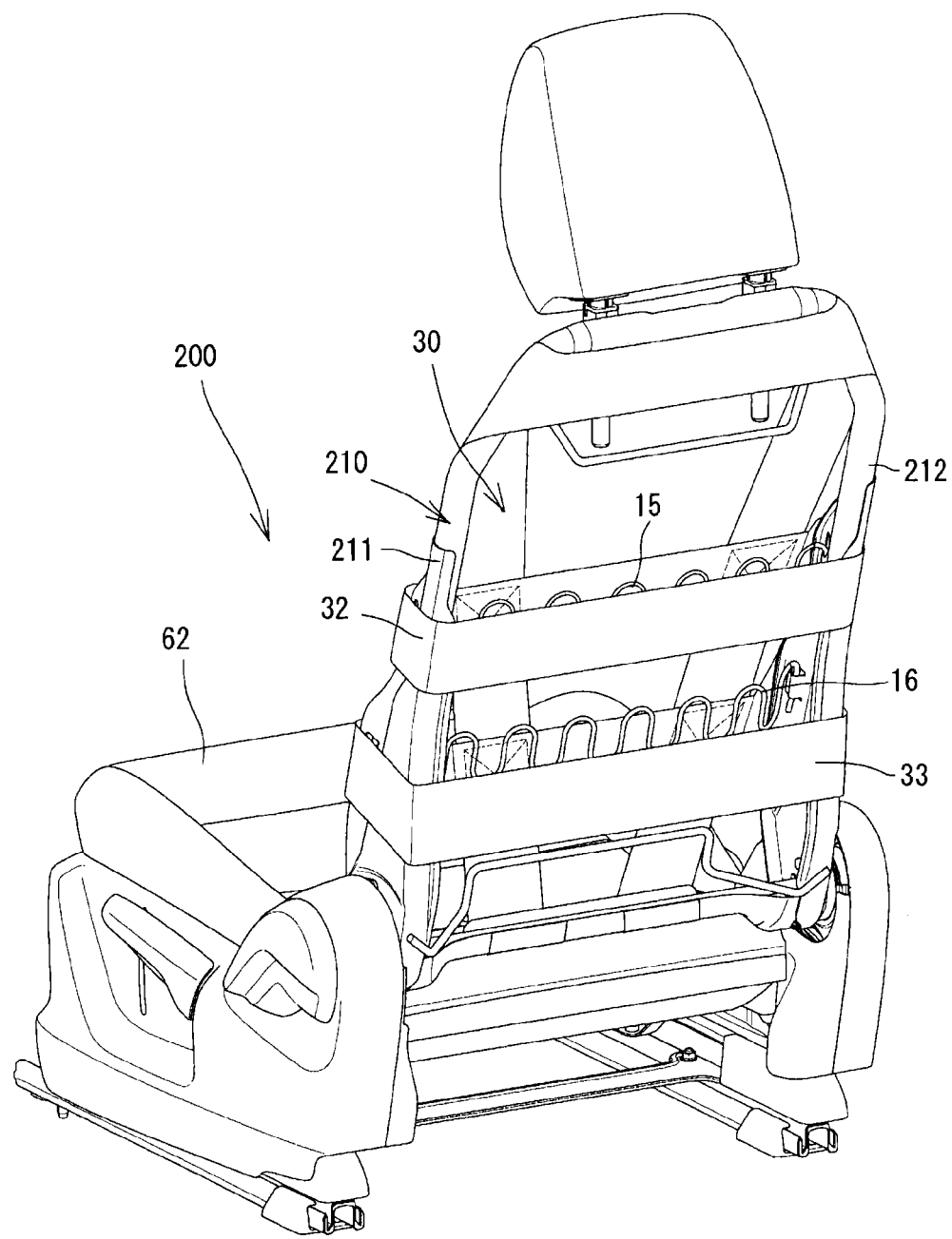
FIG. 18 is a perspective view seen from a rear surface side in FIG. 17.

Further, in the above description, the two-dimensional net 51 is used as the base support member 50, but the base support member 50 can be formed from a belt-shaped member (belt-shaped support member for base) 510 made of the same material as that of the belt-shaped support member 40 for seat cushion, instead of the two-dimensional net 51, as illustrated in FIG. 15. The belt-shaped support member 510 for base includes: two front-rear direction belt members 511, 512 disposed in parallel at an interval; and two left-right direction belt members 513, 514 connecting the two front-rear direction belt members 511, 512 at a forward position and a rearward position of the two front-rear direction belt members 511, 512. Front end portions 511a, 512a of the front-rear direction belt members 511, 512 are engaged with the front frame part 23, and their rear end portions 511b, 512b are engaged with the rear lateral frame part 24c. Further, both edges 513a, 513b of the left-right direction belt member 513 located at the forward position protrude further sideways from its connection portions with the front-rear direction belt members 511, 512 and are engaged with the reinforcing longitudinal frame parts 25, 26 disposed under the side frame parts 21, 22.

The use of the belt-shaped support member 510 for base enables the quicker drainage of rainwater or the like. In FIG. 15, the belt-shaped support member 510 for base is formed by using the two front-rear direction belt members 511, 512 and the two left-right direction belt members 513, 514, but it is a matter of course that their numbers, mutual connection positions, and so on are not limited to these.

FIG. 16 to FIG. 21 illustrate application examples to a vehicle seat, especially to an automobile seat 200. Some automobile seat 200 has, between side frame parts 211, 212 of a seat back frame 210, S-springs 15, 16 suspended in the vicinity of the breast and in the vicinity of the waist to support these. In such a case, in order to alleviate a local abutting feeling of the S-springs 15, 16, it is necessary to make a special contrivance to a cushion material covering their surfaces. However, according to this embodiment, a second belt member 32 and a third belt member 33 in a belt-shaped support member 30 for seat back of the seat back frame 210 are disposed so as to be located on front surface sides of the S-springs 15, 16. Consequently, since the second belt member 32 and the third belt member 33 are close to the human body, it is possible to alleviate the local abutting feeling of the S-springs 15, 16. Owing to the very simple structure, it is possible to alleviate the abutting feeling without increasing the weight of the automobile seat 200. Note that, in the case of the automobile seat 200, a cushioning part 61 for seat back is structured to be reclined relatively to a cushioning part 62 for seat cushion, and therefore, the structure is different from that of the above-described embodiment in that a surface cushion layer 60 is separated into the cushioning part 61 for seat back and the cushioning part 62 for seat cushion as illustrated in FIG. 16 to FIG. 21.

Further, in the application to the automobile seat 200 as well, it is possible to reduce a hammock feeling by disposing a belt-shaped support member 40 for seat cushion as in the above-described embodiment. The belt-shaped support member 40 for seat cushion can have the same structure as that of the above-described embodiment, but as illustrated in FIG. 19 and FIG. 20, the belt-shaped support member 40 for seat cushion is preferably structured to have longitudinal belt parts 44, 45 for seat cushion which extend from lower portions of longitudinal belt parts 31b, 31c for seat back of the belt-shaped support member 30 for seat back, pass on a lower surface side of the cushioning part 62 for seat cushion and an intermediate cushion layer 70 supported by a seat cushion frame 220, and at their end portions 44a, 45a, are connected to a front frame part 223 of the seat cushion frame 220.

Here, the longitudinal belt parts 31b, 31c for seat back of the belt-shaped support member 30 for seat back and the longitudinal belt parts 44, 45 for seat cushion of the belt-shaped support member 40 for seat cushion are preferably integrated by connecting the lower portions of the longitudinal belt parts 31b, 31c for seat back and rear portions of the longitudinal belt parts 44, 45 for seat cushion by sewing or the like. Alternatively, they may of course be integrated in such a manner that the longitudinal belt part 31b for seat back and the longitudinal belt part 44 for seat cushion on one side are made of a single belt-shaped member, and the longitudinal belt part 31c for seat back and the longitudinal belt part 45 for seat cushion on the other side are made of a single belt-shaped member.

Figure 20:
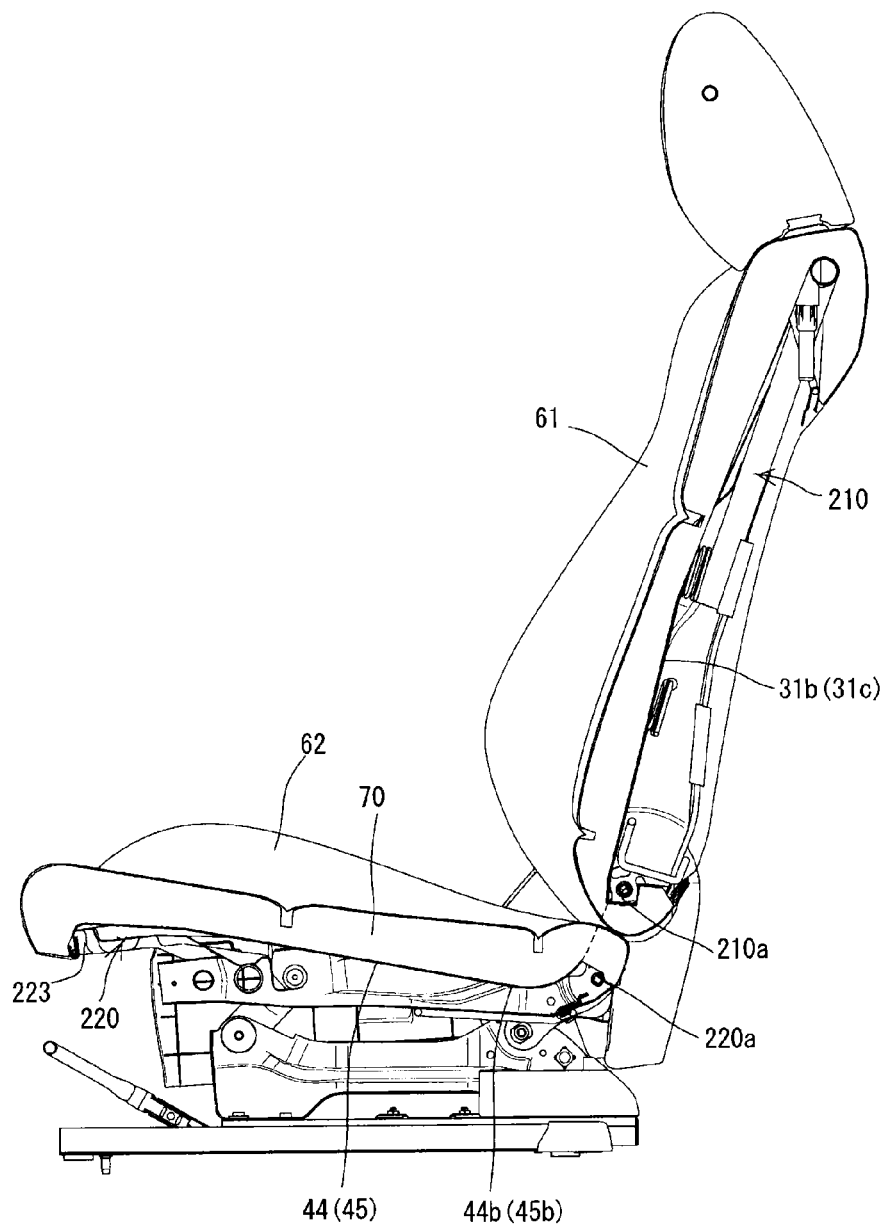
FIG. 20 is a cross-sectional view taken along A-A line in FIG. 16.
Figure 21:
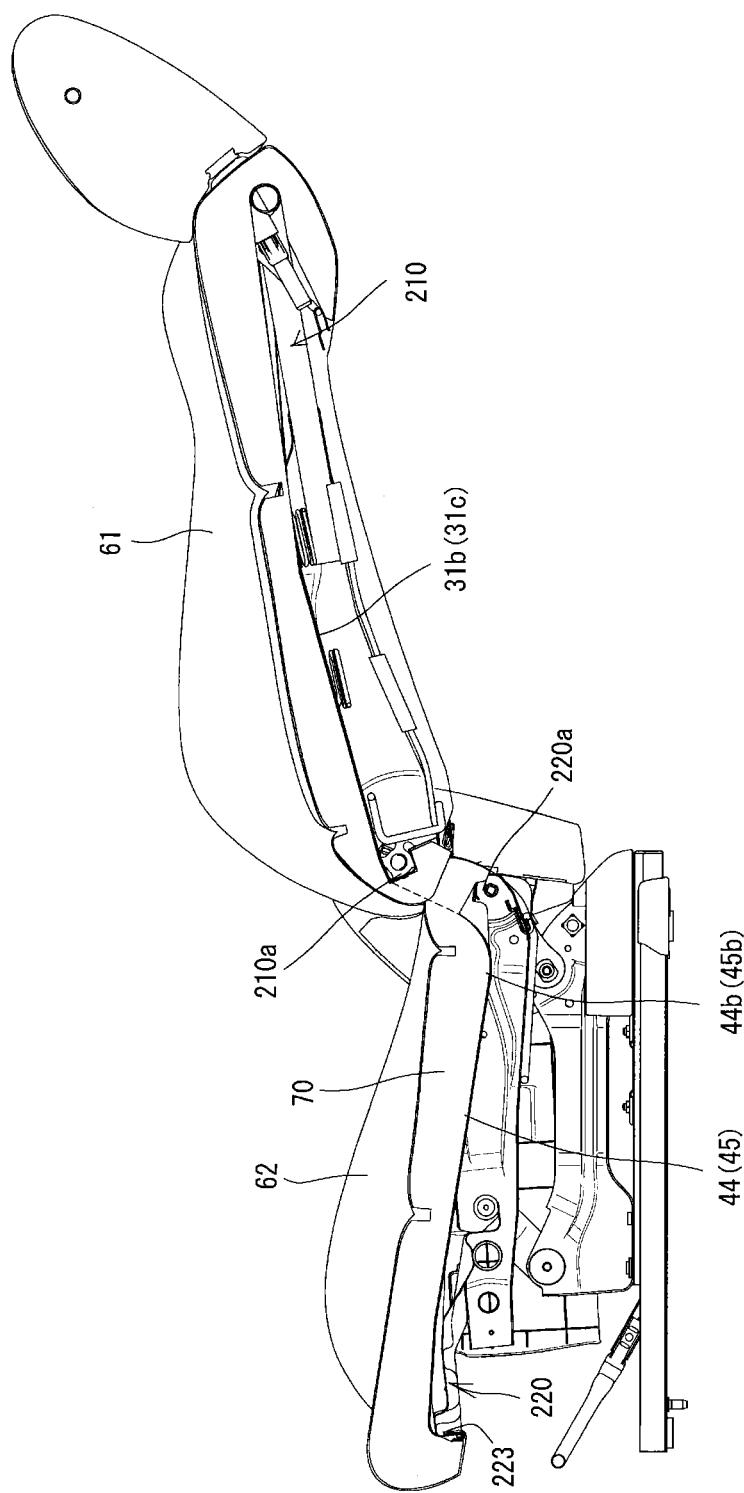
FIG. 21 is a cross-sectional view illustrating a state where a seat back frame and the cushioning part for seat back are reclined by a predetermined angle from the state in FIG. 20.

In this structure, when the seat back frame 210 (cushioning part 61 for seat back) is reclined relatively to the seat cushion frame 220 (cushioning part 62 for seat cushion) by a predetermined angle, to, for example, a fully flat state as illustrated in FIG. 21, a lower end 210a of the seat back frame 210 and a rear end 220a of the seat cushion frame 220 separate as from FIG. 20 to FIG. 21, so that a distance therebetween increases, and therefore, positions of rear portions 44b, 45b of the longitudinal belt parts 44, 45 for seat cushion become higher as from FIG. 20 to FIG. 21. Consequently, when the fully flat state is reached, the position of the hip of the seated person becomes higher, so that the seated person can take a lying posture or a rearward inclining posture without any strange feeling. That is, owing to the belt-shaped members, namely, the longitudinal belt parts 44, 45 for seat cushion, it is possible to achieve interlocking adjustment of the position of the seat cushion frame 220 (cushioning part 62 for seat cushion) at the time of the reclining, the structure is simple, and the weight does not greatly increase even when such an adjusting mechanism is provided.

Figure 19:
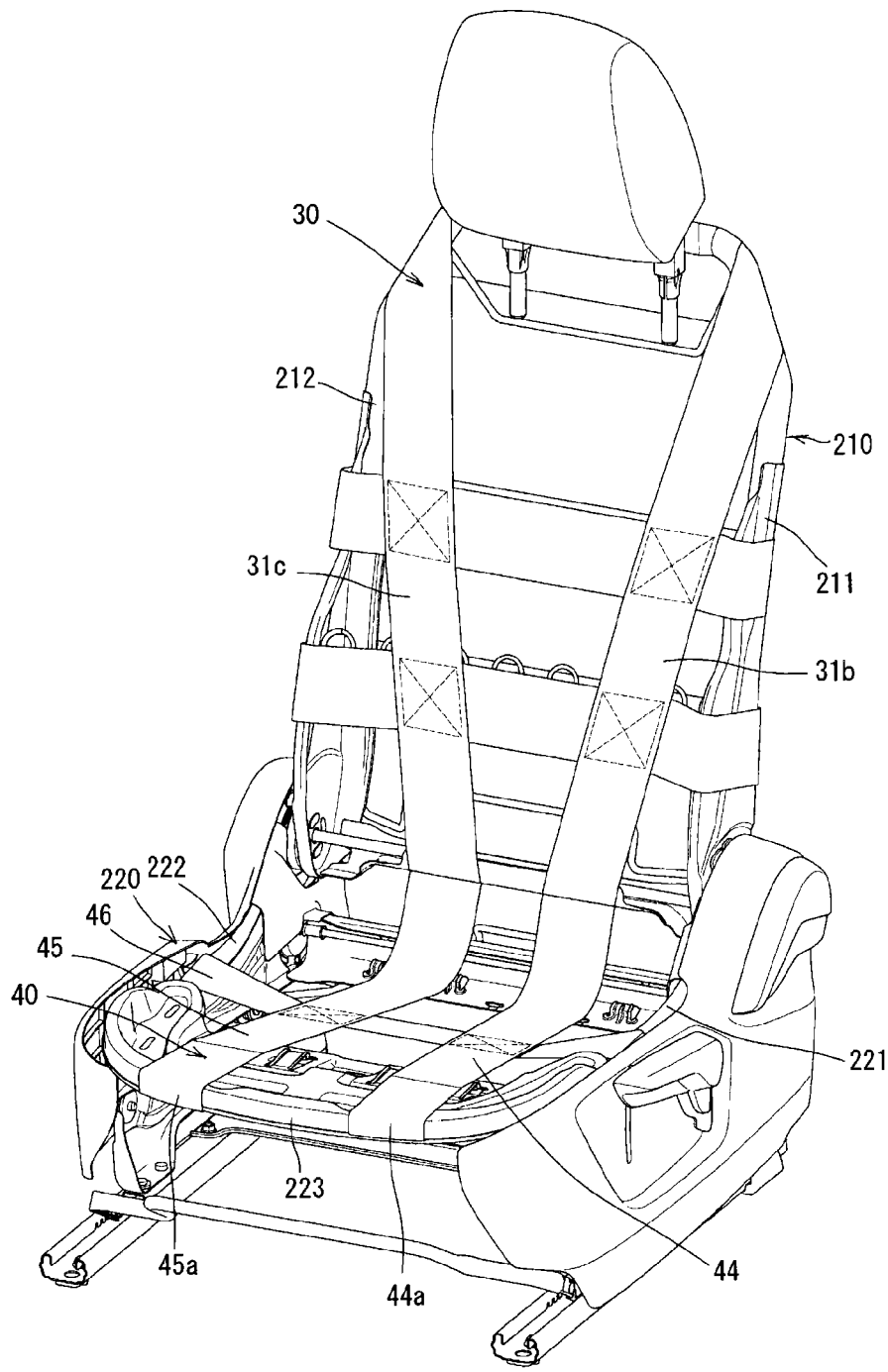
FIG. 19 is a perspective view of the application example in FIG. 16, with the cushioning part for seat back and a cushioning part for seat cushion being removed.

Note that the reference sign 46 written in FIG. 19 denotes a lateral belt part for seat cushion suspended between the side frame parts 221, 222 of the seat cushion frame 220 and having middle portions connected to the longitudinal belt parts 44, 45 for seat cushion, and owing to this, it is possible to more surely support the load of the seated person. Further, as the intermediate cushion layer 70 of the automobile seat 200, not only the three-dimensional knitted fabric but also a urethane material can be used because it is used only in the car and thus rainwater does not stay thereon.

Figure 22:
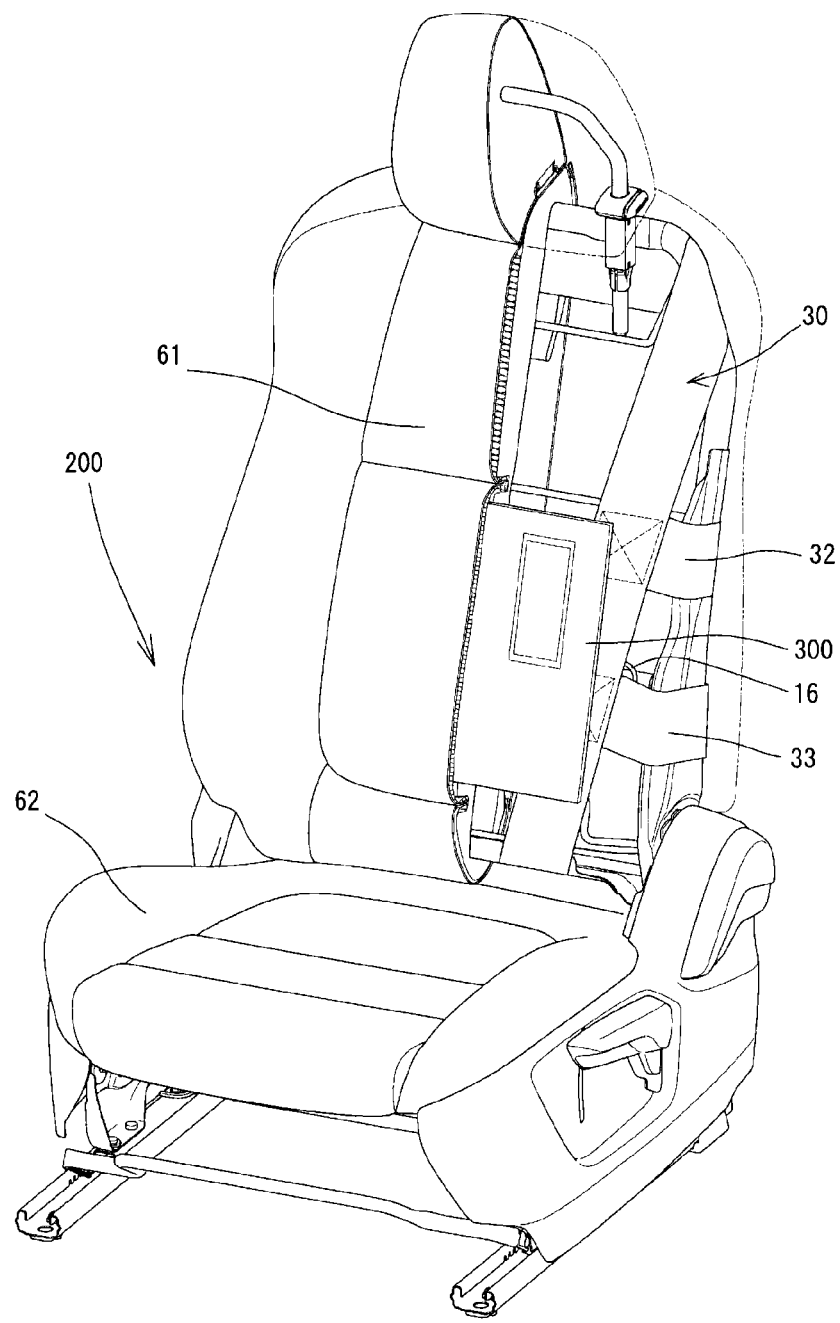
FIG. 22 is a perspective view illustrating a state where a bio-signal detection sensor is disposed, with the automobile seat being partly cut out.

FIG. 22 illustrates a view in which, between the cushioning part 61 for seat back of the surface cushion layer 60 and the above-described belt-shaped support member 30 for seat back, a bio-signal detection sensor 300 in a plate shape is disposed. In the automobile seat 200, the present applicant has proposed that such a bio-signal detection sensor 200 is disposed on a back side of a seated person, the movement of the heart and the aorta is detected as a bio-signal, and by analyzing the bio-signal, a body condition, sleepiness, and so on of the person are determined. Therefore, when such a bio-signal detection sensor 300 is disposed, the above-described belt-shaped support member 30 for seat back can be used as a support member of the bio-signal detection sensor 300 even though its structure is simple.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

REFERENCE SIGN LIST 1, 200 seat
10, 210 seat back frame
11, 12, 211, 212 side frame part
13 upper frame part
20, 200 seat cushion frame
21, 22, 221, 222 side frame part
23, 223 front frame part
24 rearward extending part
24c rear lateral frame part
30 belt-shaped support member for seat back
40 belt-shaped support member for seat cushion
50 base support member
51 two-dimensional net
52 three-dimensional knitted fabric
60 surface cushion layer
70 intermediate cushion layer

What is claimed is:

1. A seat comprising:
a belt-shaped support member for seat back supported on an upper portion of a seat back frame and extending up to a lower portion of the seat back frame;
a belt-shaped support member for seat cushion extending from a lower portion of the belt-shaped support member for seat back in a direction toward a front portion of a seat cushion frame and having end portions connected to the front portion of the seat cushion frame;
a cushioning part for seat back supported by the seat back frame; and
a cushioning part for seat cushion supported by the seat cushion frame,
wherein the belt-shaped support member for seat cushion shares and supports a load given from a seated person to the belt-shaped support member for seat back, with the end portions which are connected to the front portion of the seat cushion frame working as fulcrums,
wherein the belt-shaped support member for seat back has a plurality of longitudinal belt parts for seat back extending from the upper portion up to the lower portion of the seat back frame to form a substantially V-shape, and
wherein a middle part of the belt-shaped support member for seat cushion is connected to lower portions of the longitudinal belt parts for seat back and is provided in a substantially U-shape in a plane view.

2. The seat according to claim 1,
wherein a pair of side frame parts forming the seat cushion frame are each made of a pipe member formed in a substantially L-shape, and shorter side parts of the side frame parts are located at the front portion, and wherein the end portions of the belt-shaped support member for seat cushion are connected to the shorter side parts of the side frame parts.

3. The seat according to claim 1, further comprising a base support member supported by the seat cushion frame, wherein the seat cushion frame has a rearward extending part extending more rearward than a connection portion between the lower portion of the belt-shaped support member for seat back and the belt-shaped support member for seat cushion, and the base support member is supported between the front portion of the seat cushion frame and the rearward extending part.

4. The seat according to claim 3, wherein the base support member has:

a two-dimensional net or a belt-shaped support member for base; and an intermediate cushion layer which is provided in a range from a front frame part of the seat cushion frame up to the connection portion between the lower portion of the belt-shaped support member for seat back and the belt-shaped support member for seat cushion so as to be stacked on the two-dimensional net or the belt-shaped support member for base.

5. The seat according to claim 3, wherein the base support member has:

a two-dimensional net or a belt-shaped support member for base; and an intermediate cushion layer which is provided in a range from a front frame part of the seat cushion frame up to a center position of a seat cushion in terms of a front and rear direction so as to be stacked on the two-dimensional net or the belt-shaped support member for base.

6. The seat according to claim 4, wherein the intermediate cushion layer is a three-dimensional knitted fabric.

7. The seat according to claim 5, wherein the intermediate cushion layer is a three-dimensional knitted fabric.

8. A seat comprising:

a belt-shaped support member for seat back supported on an upper portion of a seat back frame and extending up to a lower portion of the seat back frame;

a belt-shaped support member for seat cushion extending from a lower portion of the belt-shaped support member for seat back in a direction toward a front portion of a seat cushion frame and having end portions connected to the front portion of the seat cushion frame;

a cushioning part for seat back supported by the seat back frame; and a cushioning part for seat cushion supported by the seat cushion frame, wherein the belt-shaped support member for seat cushion shares and supports a load given from a seated person to the belt-shaped support member for seat back, with the end portions which are connected to the front portion of the seat cushion frame working as fulcrums, wherein the belt-shaped support member for seat back has a plurality of longitudinal belt parts for seat back extending from the upper portion to the lower portion of the seat back frame to form a substantially V-shape, and wherein the belt-shaped support member for seat cushion has longitudinal belt parts for seat cushion which extend from lower portions of the longitudinal belt parts for seat back of the belt-shaped support member for seat back, pass on a lower surface side of the cushioning part for seat cushion supported by the seat cushion frame, and at end portions thereof, are connected to the front portion of the seat cushion frame.

9. The seat according to claim 8, wherein the longitudinal belt parts for seat back of the belt-shaped support member for seat back and the longitudinal belt parts for seat cushion of the belt-shaped support member for seat cushion are integrated, and wherein, when the seat back frame is reclined by a predetermined angle relatively to the seat cushion frame, a rear portion of the cushioning part for seat cushion lifts up more than before the seat back frame is reclined by the predetermined angle, due to the longitudinal belt parts for seat cushion.

* * * * *